(12) United States Patent
Wentz et al.

(10) Patent No.: US 10,735,205 B1
(45) Date of Patent: Aug. 4, 2020

(54) METHODS AND SYSTEMS FOR IMPLEMENTING AN ANONYMIZED ATTESTATION CHAIN

(71) Applicant: Ares Technologies, Inc., Cambridge, MA (US)

(72) Inventors: Christian Wentz, Providence, RI (US); Ilia Lebedev, Cambridge, MA (US); Anna Iysyanskaya, Providence, RI (US)

(*) Notice: Subject to any disclaimer, the term of this patent is extended or adjusted under 35 U.S.C. 154(b) by 0 days.

(21) Appl. No.: 16/682,809

(22) Filed: Nov. 13, 2019

Related U.S. Application Data

(60) Provisional application No. 62/815,493, filed on Mar. 8, 2019.

(51) Int. Cl.
*H04L 9/32* (2006.01)
*H04L 9/06* (2006.01)

(52) U.S. Cl.
CPC .......... *H04L 9/3257* (2013.01); *H04L 9/0637* (2013.01); *H04L 9/3265* (2013.01)

(58) Field of Classification Search
CPC .... H04L 9/3257; H04L 9/0637; H04L 9/3265
See application file for complete search history.

(56) References Cited

U.S. PATENT DOCUMENTS

| | | | |
|---|---|---|---|
| 9,363,087 B2 | 6/2016 | Hawblitzel et al. | |
| 9,467,292 B2 | 10/2016 | Nahari | |
| 9,935,773 B2 | 4/2018 | Sarangdhar et al. | |
| 10,397,005 B2 | 8/2019 | Brickell | |
| 2005/0169461 A1* | 8/2005 | Canard | H04L 9/3255 380/28 |
| 2008/0130893 A1* | 6/2008 | Ibrahim | G06F 21/572 380/277 |
| 2010/0154040 A1* | 6/2010 | Chiu | H04L 63/0823 726/5 |
| 2010/0329464 A1* | 12/2010 | Kerschbaum | G06Q 10/087 380/279 |
| 2012/0137137 A1* | 5/2012 | Brickell | G06F 21/73 713/182 |

(Continued)

FOREIGN PATENT DOCUMENTS

| | | |
|---|---|---|
| WO | 2018150154 | 8/2018 |
| WO | 2019043360 | 3/2019 |
| WO | 2019125766 | 6/2019 |

*Primary Examiner* — Darren B Schwartz
(74) *Attorney, Agent, or Firm* — Caldwell Intellectual Property

(57) ABSTRACT

A system for implementing an anonymized attestation chain. The system includes a first device having a first hardware-generated secret and a first verification datum linked to the first hardware-generated secret. The first device is designed and configured to receive an originating signature from an originating device and an originating verification datum. The originating signature includes a secure proof of an originating device secret. The originating signature signs a message referencing the first verification datum, and the originating signature is verified by the originating verification datum. First device generates a first anonymized signature set. The first anonymized signature set includes a modified first verification datum, a modified originating signature, and a modified originating verification datum. First devices delegates the at least a credential to a second verification datum.

20 Claims, 4 Drawing Sheets

(56) References Cited

U.S. PATENT DOCUMENTS

| | | | |
|---|---|---|---|
| 2014/0093074 A1* | 4/2014 | Gotze | H04L 9/0866 380/45 |
| 2014/0173274 A1* | 6/2014 | Chen | H04L 9/3073 713/155 |
| 2014/0205090 A1* | 7/2014 | Li | H04L 9/3066 380/44 |
| 2015/0128237 A1* | 5/2015 | Lund | H04L 63/08 726/7 |
| 2015/0188944 A1* | 7/2015 | Dyer | H04L 63/20 726/3 |
| 2015/0263855 A1* | 9/2015 | Schulz | H04L 9/0827 713/155 |
| 2017/0244695 A1* | 8/2017 | Lund | H04L 63/0815 |
| 2017/0364908 A1* | 12/2017 | Smith | G06Q 20/023 |
| 2018/0076957 A1* | 3/2018 | Watanabe | H04L 9/3278 |
| 2018/0167198 A1* | 6/2018 | Muller | G06F 21/16 |
| 2018/0270058 A1* | 9/2018 | Watanabe | H04L 9/3297 |
| 2019/0020647 A1 | 1/2019 | Sinha et al. | |
| 2019/0109874 A1 | 4/2019 | Samuel et al. | |
| 2019/0116038 A1 | 4/2019 | Sprague | |
| 2019/0229919 A1 | 7/2019 | Gurkan et al. | |
| 2019/0312734 A1 | 10/2019 | Wentz et al. | |

\* cited by examiner

METHODS AND SYSTEMS FOR IMPLEMENTING AN ANONYMIZED ATTESTATION CHAIN

CROSS-REFERENCE TO RELATED APPLICATIONS

This application claims the benefit of priority of U.S. Provisional Patent Application Ser. No. 62/815,493, filed on Mar. 8, 2019, and titled "METHODS AND SYSTEMS FOR IMPLEMENTING AN ANONYMIZED ATTESTATION CHAIN," which is incorporated by reference herein in its entirety.

FIELD OF THE INVENTION

The present invention generally relates to the field of computer security. In particular, the present invention is directed to methods and systems for implementing an anonymized attestation chain.

BACKGROUND

One way that security authorization may be transferred from one device to another is via a chain of digital signatures or attestations. Unfortunately, what such chains possess in terms of transparency and security, they typically lack in anonymity; a device may be associated with a public key corresponding to a signature transferring that device a security right or right to an asset, making it readily trackable in a given environment or platform. This is exacerbated when that public key is linked to particular devices or persons, for instance, by a record maintained at a device manufacturer.

SUMMARY OF THE DISCLOSURE

In an aspect, a method of implementing an anonymized attestation chain, includes receiving, at a first device having a first hardware-generated secret and a first verification datum linked to the first hardware-generated secret, an originating signature from an originating device and an originating verification datum, wherein the originating signature further includes a secure proof of an originating device secret, the originating signature signs a message referencing the first verification datum, the message conferring at least a credential to the first device, and the originating verification datum verifies the originating signature and generating, by the first device, an anonymized signature set, wherein the anonymized signature set further includes a modified first verification datum linked to the first device secret, a modified originating signature, wherein the modified originating signature comprises a secure proof of the originating device secret, and the modified originating signature signs a modified first message referencing the modified first verification datum, and a modified originating verification datum based on the originating verification datum, wherein the modified originating verification datum verifies the modified originating signature. The method includes delegating, by the first device, the at least a credential to a second verification datum, wherein delegating further includes generating a second message conferring the credential to the second verification datum and digitally signing the second message using the first device hardware secret.

In another aspect, a system for implementing an anonymized attestation chain includes a first device having a first hardware-generated secret and a first verification datum linked to the first hardware-generated secret and configured to receive an originating signature from an originating device and an originating verification datum, wherein the originating signature further includes a secure proof of an originating device secret, the originating signature signs a message referencing the first verification datum, the message conferring at least a credential to the first device, and the originating verification datum verifies the originating signature, to generate an anonymized signature set, wherein the anonymized signature set further includes a modified first verification datum linked to the first device secret, a modified originating signature, wherein the modified originating signature comprises a secure proof of the originating device secret, and the modified originating signature signs a modified first message referencing the modified first verification datum and a modified originating verification datum based on the originating verification datum, wherein the modified originating verification datum verifies the modified originating signature, and to delegate the at least a credential to a second verification datum, wherein delegating further comprises generating a second message conferring the credential to the second verification datum and digitally signing the second message using the first device hardware secret.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
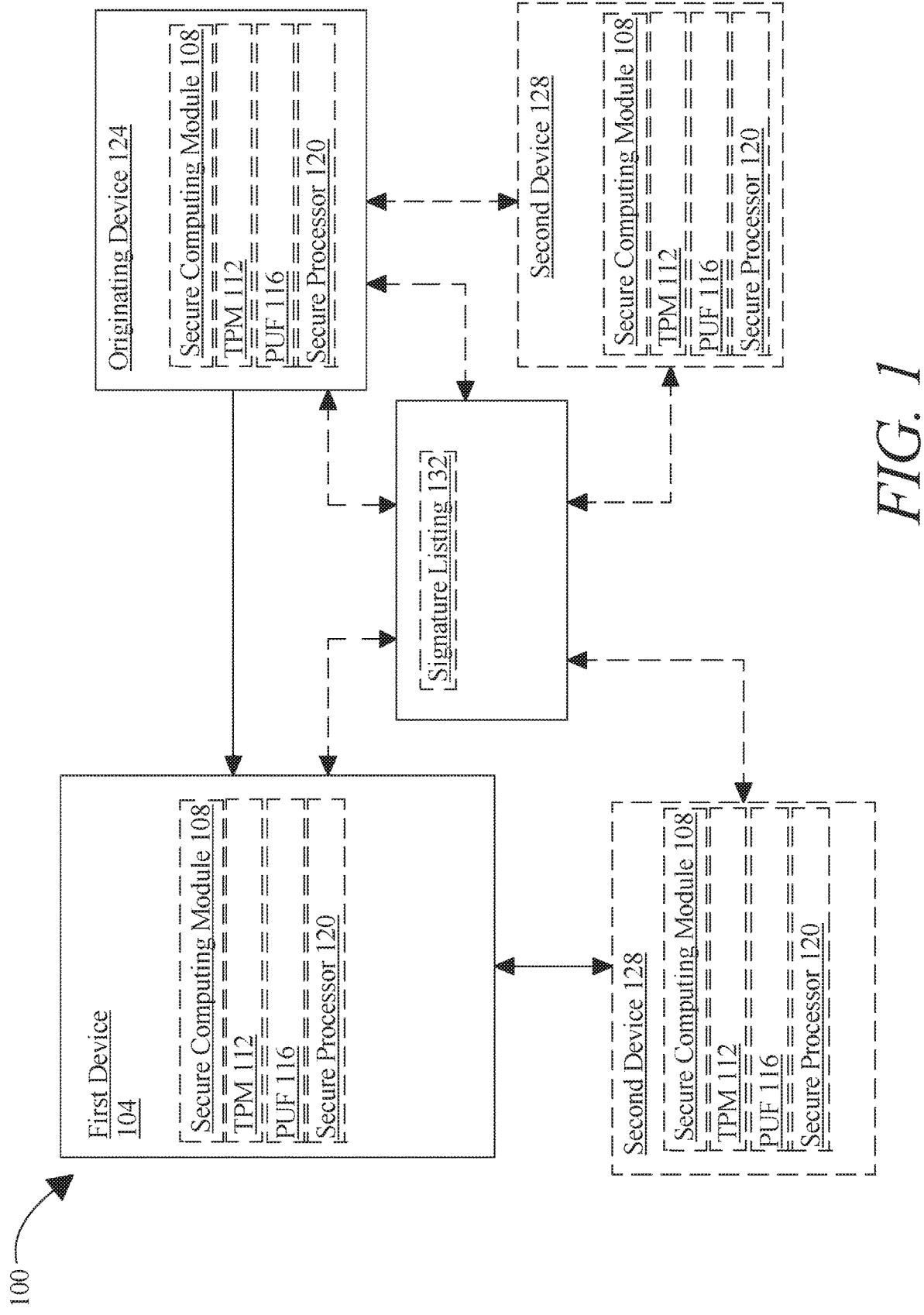
FIG. 1 is a block diagram illustrating an exemplary embodiment of a system of implementing an anonymized attestation chain.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for implementing anonymized attestation chain. In an embodiment, a first device is able to generate delegable anonymous credentials that maintain system integrity and allow for device authentication without device identification. In an embodiment, first device generates a signature on a message which includes a public key. Using anonymized attestation chain, first device is able to transform its signature into a subsequent equivalent and unlinkable signature that can sign a new message with a new public key. This chain of attestation allows for the new message to be unable to be linked back to the original message and for the new public key to be unable to be linked back to the original public key. Anonymous attestation can be utilized by subsequent devices downstream in the attestation chain to perform authentication without identification of previous devices upstream in the attestation chain. Attestation chain allows for the implementation of delegable anonymous credentials. Anonymous credentials may be "unmaskable," for instance by device originating the attestation chain.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Some embodiments of the disclosed systems and methods involve creation and/or evaluation of digital signatures. A digital signature as used herein is a secure proof performed on an element of data, referred to as a "message"; secure proof may include any secure proof as described in this disclosure. Message may include without limitation an encrypted mathematical representation of a file or other set of data. File or set of data may confer credentials, which may demonstrate, without limitation, any result of any authentication or authorization process performed by a signing device. Credentials, which may take the form of authorization tokens, may be generated, conferred, signed, or otherwise manipulated in any suitable way, including without limitation as disclosed in U.S. Provisional Application 62/758,367, filed on Nov. 9, 2018 and entitled "METHODS AND SYSTEMS FOR A DISTRIBUTED CERTIFICATE AUTHORITY," the entirety of which is incorporated herein by reference. Secure proof may be enacted, without limitation, by encrypting message using a private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In some embodiments, persons, devices, or transactions may be authenticated or assigned a confidence level using digital certificates and/or cryptographic keys. In one embodiment, a digital certificate is a file that conveys information and links the conveyed information to a "certificate authority" that is the issuer of a public key or manager of public keys issued by other entities in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity or member of a particular group; thus, if the certificate authority may be trusted, and the private key has not been stolen, the ability of an entity to produce a digital signature confirms the identity or membership of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature, or a member of the group to which the entity purportedly belongs; for instance, if the public key that decrypts the known signature also decrypts the digital signature, where determining that decryption has occurred authentically may include an expected value, datum, etc., in non-limiting example in the case of a keyed-hash message authentication code (keyed HMAC) or hash-based authentication code (HMAC), the digital signature may be considered verified. Digital signature may also be used to verify that the file has not been altered since the formation of the digital signature.

In an embodiment, a certificate authority may include a manufacturer of a device. For instance, manufacturer may verify that a private key, or secret usable to produce a secure proof as set forth in further detail below, available to a device is associated with one or more devices produced by the manufacturer; verification may take the form of a digital signature created by the manufacturer, signing a verification datum and/or public key corresponding to the private key and/or secret belonging to the device. Verification may be performed, without limitation, by physically and/or electrically validating a silicon die or other physical circuit element, for instance via automated test equipment, a probe station or other direct or indirect means of interrogating a circuit to validate that it is authentically manufactured, provides a particular expected behavioral result, or the like; such verification may, for instance, permit a manufacturer to determine that a sub-component or assembly manufactured by another party in a supply chain was constructed authentically according to a design of the manufacturer. Verification may additionally or alternatively be performed by reliance upon the trustworthiness of a subcomponent manufacturer, and/or utilizing a cryptographic attestation result of such a subcomponent. In non-limiting example, a device integrating an Intel SGX-enabled processor or other hardware or software device configured to perform an attestation of credentials may configure the processor to perform an attestation to the processor's manufacturer, make a determination as to the trustworthiness of the processor based upon the attestation result, utilize this determination on the result as evidence of correct construction, and sign a verification datum and/or pubic key corresponding to the private key and/or secret belonging to the device. Certificate authority may include any device and/or devices acting as certificate authorities as disclosed in U.S. Provisional Application 62/758,367, incorporated by reference above.

Private key and/or secret may be device-specific or may be issued to a group of devices; in the latter case, a device signing with private key and/or generating a secure proof based on secret may convey that it belongs to that group of devices, without making it possible for a device evaluating the signature and/or secure proof to identify the specific device other than as a member of the group. A secure proof, as used herein, is a protocol whereby an output is generated that demonstrates possession of a secret, such as a secret stored in or produced by originating device, without demonstrating the entirety of the secret; in other words, a secure proof by itself, is insufficient to reconstruct the entire secret, enabling the production of at least another secure proof using at least a secret. Where at least a secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. A group of devices so identified may have characteristics in common, such as instances and/or versions of hardware, firmware, or other elements, including without limitation secure computing modules as described in further detail below; identification that device is in group may, for instance, indicate that device may be trusted to a certain degree. Group membership, attestation, and/or inclusion in an attestation chain, for instance as described in this disclosure, may be specific to a piece of software running on a specific device, or to a hardware protected secure container (an enclave), such that any code executed within the enclave can be assumed to be executed as its instruction set dictates upon that instruction set being loaded into memory, or otherwise processed and/or transmitted via attestation chains, or be granted a certain confidence level, by virtue of degrees to which its secure computing module may be trusted to perform authentic attested processes or the like. Manufacturer and/or devices participating in embodiments of systems as described herein may receive, assign, or generate confidence levels associated with such group identities, including without limitation assignment of lower or minimal confidence levels for groups with regard to which a vulnerability to hacking or exploits has been identified, a group one member of which has been associated with an illegal, fraudulent, or undesirable act, a group one member of which has been compromised, hacked, or stolen, or the like. In an embodiment, where at least a member of a group has been compromised, given a lower confidence level, or the like, individual devices in group having device-specific secrets or private keys may sign transactions with such keys, sacrificing a degree of anonymity to differentiate themselves from compromised members of such groups. Alternatively or additionally, a verifier of an attestation may require an attesting device to provide evidence that it is not one of a particular set of devices believed to have been compromised or otherwise revoked. Practically this list of malicious devices may include a list of suspected signatures created by such devices, rather than the device private key; proof of non-membership may include provision of proof that the attesting device could not have generated the same signature. In either case, attesting device may generate a proof of innocence by proving membership in an honest set (e.g., providing a datum signed by the device's private key or other persistent unique identifier to an authority). In an alternative embodiment, either as part of the algorithm determining the authenticity of a device or device-and-software component and assigning or refreshing certificates or credentials conferring some trusted status, and/or after initial assignment of certificates, a device is required to prove to an authority that it is not a member of a dishonest set (e.g. is not a device suspected of compromise), the compromised device being identified by an example of a signature created by said device or some other means. In such an example, the element wishing to prove innocence generates a proof that it could not have generated the example of a compromised signature.

In an embodiment, a protocol may be implemented that modifies a particular element of the credential issued to a device (a credential that confers in that device a device-specific, device-and-software specific, or set of one or more of the preceding) at some interval of time, that interval being fixed or variable. A result may be that at least the issuer or set of issuers may make a determination based on the credential issued to an element or the signature of said element as to in what interval of time, or time epoch, the credential was issued. Further, protocol may incorporate an algorithm that outputs a proof of a given device's innocence by either of the above means or in combination, the input of the algorithm being the set of suspected compromised signatures from the same time epoch. In contrast to existing approaches, a proof of innocence is specific to the set signatures from suspected compromised devices whose credentials were issued in the same window of time as the device providing the proof. Thus, rather than requiring that a device prove that it has not made any of the suspected compromised signatures over all time, the device may only be required to prove non-membership in or membership in a much smaller group, conferring significant performance benefit.

Group keys and/or secrets may be embedded in hardware or software of devices during manufacture, as described in further detail below. Group keys and/or secrets may be assigned and/or signed by devices other than manufacturers; group keys and/or assignment of group keys may be used in direct anonymous attestation as described in further detail below. Group keys may enable processes of identification and/or attestation, such as without limitation direct anonymous attestation, to be performed in which a digital signature and/or secure proof confirms that an entity and/or device is part of a group but cannot determine which member of a group it is.

In other embodiments, for instance as described in further detail below, where trust in a single certificate authority is undesirable (e.g., where there is concern of the certificate authority and verifier colluding, or there is concern that a single certificate authority may be vulnerable to attack), the same functionality may be accomplished by a group of certificate authorities acting to authenticate in coordination, with the requirement that a threshold number of the group of certificate authorities (e.g. via multi-signature), and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Additional embodiments may include group signature schemes that issue certificates on a membership public key generated by a secure computing module as described in further detail below; in such scenarios, authentication may include proof by the secure computing module that the secure computing module possesses a secret key to a public key/certificate pair. Although digital signatures have been introduced here as performed using public key cryptographic systems, digital signatures may alternatively or additionally be performed using symmetric cryptography and/or any interactive or non-interactive zero-knowledge proof; for instance, a proof may be recorded in conjunction with a datum, and a verification may be performed by any party seeking to evaluate the proof.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 1, first device 104 may have a first hardware-generated secret and a first verification datum linked to the first hardware-generated secret. First hardware-generated secret includes a hardware generated secret generated or extracted using hardware such as a secure computing module 108, trusted platform module, hardware security module, key or seed datum injected in a secure environment, and/or physically unclonable function as described in more detail below. Alternatively or additionally, where secure computing module lacks a hardware-generate secret provided in a secure environment, a confidence level may be assigned to a degree to which it may be relied upon, where confidence level may be determined in any way disclosed in this disclosure; confidence level may be included in credentials or otherwise made available, or may be used in determining what credentials are provided to first device 104. First hardware-generated secret may include a private key of a public/private key pair. First hardware-generated secret may be usable to produce a secure proof as set forth in further detail below. First hardware-generated secret may be device-specific or may be issued to a group of devices and may be a shared secret; in the latter case, a device signing with private key and/or generating a secure proof based on secret may convey that it belongs to that group of devices, without making it possible for a device evaluating the signature and/or secure proof to identify the specific device. A group of devices so identified may have characteristics in common, such as instances and/or versions of hardware, firmware, or other elements, including without limitation secure computing modules 108 as described in further detail below; identification that device is in group may, for instance, indicate that device may be trusted to a certain degree, or be granted a certain confidence level, by virtue of degrees to which its secure computing module may be trusted to perform authentic attested processes or the like. A group key may include for example a public key that is shared by a certain class or lot of devices produced by a manufacturer. For example, group key may include a set of hardware-based secrets manufactured into each such device by a manufacturer, each of which may be used to produce digital signatures and/or secure proofs verifiable by a shared verification datum. First verification datum, as used herein, may be or include any datum that may be used to aid in evaluation of first hardware-generated secret. For example, where first hardware-generated secret includes a digital signature generated using a private key of a public key cryptographic system, verification datum may include a corresponding public key. Similarly, where first hardware-generated secret includes a zero-knowledge proof, verification datum may include verification data useable to verify zero-knowledge proof. Linking of first hardware-generated secret and first verification datum may include having first verification datum function as or be a portion of first hardware-generated secret as described in more detail below. Hardware for generation of first hardware-generated secret may be manufactured and/or implemented in any way disclosed in U.S. Nonprovisional application Ser. No. 16/506,658, filed on Jul. 9, 2019, and entitled "SECURE COMPUTING HARDWARE APPARATUS AND METHODS OF MANUFACTURING A SECURE COMPUTING HARDWARE APPARATUS," the entirety of which is incorporated herein by reference.

With continued reference to FIG. 1, any first device 104 may include a secure computing module 108. As used herein, a secure computing module 108 is a hardware or software element configured to perform one or more secured operations beyond the control of other circuit elements or software, whether incorporated with the secure computing module 108 in a circuit or computing device, or a part of an extrinsic computing device. As a result, at least one secured operation performed by secure computing module 108 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 108 and/or a system or computing device incorporating secure computing module 108 based on the above-described set of assumptions. As a non-limiting, example, a secure computing module 108 designed to produce an expected result despite all software-only attacks may give rise to a first confidence level, whereas another secure computing module 108 designed to produce its expected result in the face of all software or hardware attacks may give rise to a second confidence level; the second confidence level may be higher, owing to the reduced probability that the second secure computing module 108 would be compromised.

Still viewing FIG. 1, secure computing module 108 may include a trusted platform module (TPM 112). In an embodiment, a TPM 112 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 112 may have any suitable elements of digital or analog circuitry usable to perform one or more processes as described herein, including without limitation processes used to determine confidence levels and/or authenticate digitally signed assertions as described below. TPM 112 may have memory and/or other logic and/or a processor in its own right which may be in a non-limiting example a crypto-processor. TPM 112 may have a hard-coded process, e.g. via protected ROM or secure flash, for signing a digital signature, which may be performed using any digital signature and/or digital signature protocol described in this disclosure, including without limitation using a private key, which may be associated with a public key, and/or a class of public keys, and/or may be a private key of a symmetric cryptographic system. TPM 116 may be configured to incorporate a secure enclave and/or protocols for performing attestation on behalf of an untrusted or less trusted hardware or software element, e.g. TPM 116 may be configured to have attestation requests from such a less trusted element relayed to it for secure signing, and may include packaging of signed data for use in an attestation protocol, representative embodiments of which are included in this disclosure. For instance, and without limitation, TPM 116 may sign enclave attestations; as a non-limiting example, an enclave such as an SGX enclave or the like may be attested to using long-lived security of device keys inside the TPM 116. This private key and/or signing process may be performed using any digital signature and/or digital signing protocol described in this disclosure. For instance, and without limitation, a private key, signature, and/or signing process may be produced using a genuinely random process during manufacturing and/or at a later stage, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be determined and/or extracted via PUF processes using, for instance, a fuzzy extractor, key extractor physically unclonable function, and/or other software techniques. Private key extraction may utilize additional corrective measures, including as a non-limiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 108 may include at least PUF 116. PUF 116 may be implemented by various means. In an embodiment, PUF 116 includes one or more non-intrinsic PUFS 116. Non-intrinsic PUFS 116 may include without limitation optics-based PUFS 116. Optics-based PUFS 116 may include, as a nonlimiting example, optical PUFS 116. An optical PUF 116 may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Optical PUF may further include lattice defect based PUFs utilizing point defects in diamond or other lattices, e.g. nitrogen vacancies, C- A- B- and N3 nitrogen vacancies, boron, phosphorous, hydrogen, nickel and cobalt, silicon, germanium and sulfur-based point defects, and multivacancy complexes. In such an implementation, at least a vacancy is present, e.g. in a nanodiamond or nanodiamond coating conformed to a specific device, the conformal coating conferring specific properties establishing a unique signature to that device, within a range of sensitivity. Persons skilled in the art, upon reviewing the entirety of this disclosure, will be aware of various alternative or additional light detection devices that may be used to detect light scattered by scattering medium.

Still referring to FIG. 1 non-intrinsic PUF 116 may include without limitation a radio frequency (RF)-based PUF 116. A radio-frequency PUF 116 may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF 116 may include one or more electronics-based PUFs. Electronics-based PUFs may include, as a nonlimiting example, coating PUFs. In a non-limiting example of a coating PUF 116, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFS 116, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 116 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFS 116 may be similarly constructed. In an embodiment, an intrinsic PUF 116 circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF 116 more immune to environmental variations. However, there may be an increase in the used silicon surface area. Furthermore, these self-timed structures may be prone to entering deadlock states. Intrinsic PUFS may include glitch PUFS; this may also involve a delay-based PUF 116 construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF 116 response.

Continuing to refer to FIG. 1, PUF 116 may include a circuit producing a PUF 116 via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF 116 circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 116 120 in an embodiment include without limitation buskeeper PUFS 116, which may be similar to other PUFS 116 based on bistable memory elements but leveraging buskeeper cells. PUF 116 may also combine two or more PUF 116 designs, for instance a bistable ring PUF 116, which may be a hybrid of a ring oscillator PUF 116 and a SRAM PUF 116, wherein the structure is similar to the ring oscillator PUF 116, but the number of inverting elements is even. This may mean that the loop does not oscillate but is bistable (like the SRAM PUF 116). Using reset logic, the bistable ring may destabilize and subsequently stabilize into a state that is set by the random silicon manufacturing variations.

Continuing to view FIG. 1, PUF 116 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFS 116 may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF 116 response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF 116 response. In each case, the PUF 116 circuit element producing the variable signal may be connected to an analog to digital converter, comparator, or similar element to produce one or more output bits.

In an embodiment, and still viewing FIG. 1 PUF 116 may include a circuit implementing a quantum PUF 116. A quantum PUF 116, as used herein, is a PUF 116 that generates secrets, such as random numbers, that are unique to the PUF 116 owing to the nanostructure of atomic layers in an electronic or other component, so that the variations are governed by quantum physics, and harder to predict. Quantum PUF 116 may include a quantum confinement PUF 116, which may operate by varying its output according to variations in behavior due to quantum confinement as determined by nanostructure of atomic layers of one or more components. In an embodiment, uniqueness of a quantum PUF 116 or quantum confinement PUF 116 may be made highly probable by the inherently random nature of atomic positions and imperfections in a quantum well. Simulating structures on such a scale may require computationally infeasible amounts of computing power, even for some quantum computers, particularly where multiple quantum PUF 116 elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF 116 may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode-based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF 116 more tamper-resistant, as invasive probing of device would distort nanostructure and change the outputs; alternatively or additionally, a PUF 116 manufactured in this way may be reconfigurable by, for instance, a controlled application of heat causing modifications to the nanostructure. Implementation variations may further include exploitation of changes in PUF 116 response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204a-b. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

With continued reference to FIG. 1, PUF 116 may include, without limitation, PUFs implemented using design of vertical interconnect accesses (VIAs) in multi-layered chips or integrated circuits. A "VIA-PUF 116" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF 116. Such a VIA-PUF 116 may be extremely robust over time and across environmental conditions.

Continuing to refer to FIG. 1, PUF 116 may include one or more photonic PUFs. In an embodiment, a photonic PUF 116 may take advantage of the fact that some photonic devices can operate in a non-linear and/or chaotic manner. In a non-limiting example, a photonic PUF 116 is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultrashort optical pulses (e.g. in the femtosecond to attosecond region) may be used to probe micro-cavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF 116. Alternative or additional non-linear photonic devices may be used to implement a photonic PUF 116.

Further viewing FIG. 1, other examples of PUF 116 that may be used may include, without limitation, nano-electro-mechanical (NEM) PUFs. NEM PUFs may include PUFs that leverage stiction of a silicon nanowire to a binary gate structure. NEM PUFs may include those based on interfacial magnetic anisotropy energy, such as use of the random distribution of magnetization orientation originating from the sub-nanometer variation of oxide layer produced by the thinning process. In an embodiment, an NEM PUF 116 system may be highly robust; as a non-limiting example, NEM PUF 116 may work effectively across a wide range of environmental conditions, including without limitation thermal variation, exposure to microwave radiation, and exposure to high dose radiation at various frequencies. Additional methods for PUF 116 implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 116 and/or TPM 112; such outputs may be used to generate symmetric or asymmetric keys, private keys, zero-knowledge proofs, or other proofs of authenticity, as described in further detail below.

Continuing to refer to FIG. 1, secure computing module 108 may implement one or more secure memory storage protocols. One or more secure memory storage protocols may be protocols designed to prevent unauthorized access to memory and/or to protect secure computing module 108 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 108. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 108 may incorporate a memory controller located within the trusted computing boundary to encrypt and authenticate by a secret key memory element such as without limitation memory page tables and/or memory pages accessible by other software elements, such as an operating system. Various techniques, processes, means or elements may be used to implement the above-described secure memory protocols. For instance, secure computing module 108 may use hardware-enabled access control to protect memory access; hardware access control may, as a non-limiting example, be performed by tagging each memory entry with a "container identifier" corresponding to a page, file, or other grouping of memory, enabling secure computing module 108 to determine whether tampering has occurred.

Secure computing module 108 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 108 may operate using one or more dedicated memory objects, registers, or storage elements; as a non-limiting example, secure computing module 108 may operate with dedicated cache lines not available to other processes or circuits, preventing, e.g., stack or buffer overrun attacks to corrupt or steal data. Dedicated memory elements may be wired only to secure computing module 108; access to dedicated memory elements may be rendered impossible except by way of secure computing module 108. Secure computing module 108 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 108 may utilize oblivious random-access memory (RAM) wherein memory access patterns are obfuscated to prevent detection of memory access patterns by outside observers attempting to deduce execution details regarding processes performed using secure computing module 108. Secure computing module 108 and/or device incorporating secure computing module 108 may incorporate a trusted non-volatile storage device that provides some means of verification of secure storage capability and other properties. Memory protocols as described above may be used to implement methods of attested storage and the chain of trust beginning at PUF 116 level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 108.

Still referring to FIG. 1, secure computing module 108 may include a secure processor 120. Secure processor 120 may be a processor as described below in reference to FIG. 4. Secure processor 120 may operate autonomously from other processors and/or an operating system operating on at least a cryptographic evaluator; for instance, secure processor 120 may store entries in temporary or long-term memory in encrypted form, where decryption is impossible without private keys not available to devices, circuits or software besides secure processor 120. Encryption may likewise be impossible without private keys available only to secure processor 120. Secure processor 120 may also digitally sign memory entries using, for instance, a private key available only to secure processor 120. Keys available only to secure processor 120 may include keys directly encoded in hardware of the secure processor 120; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor 120. Secure processor 120 may be constructed, similarly to TPM 112, to frustrate alteration and/or probing to discover and/or alter private keys. Private keys may be demonstrable as uniquely associated with secure processor 120 by use of PUF 116 as described above; secure processor 120 may include, for instance, a TPM 112 as described above. Alternatively or additionally, a certificate authority as described above, which may be a manufacturer of secure processor 120, may verify that one or more public keys are associated uniquely with secure processor 120 according to any protocol suitable for digital certificates.

With continued reference to FIG. 1, secure computing module 108 may implement one or more methods of attested computation. Attested computation may include or involve one or more methods to ensure that computation of a program, known as an attested program, is trusted and signed by secure computing module 108 and/or computing device incorporating secure computing module 108; this may be supported by means to assert the state of the system memory, code, and input data. In an embodiment, attested computing may include or involve one or more methods to authenticate a boot loader. An authenticated boot loader may include a first code that the secure computing module 108 may run upon system initialization and is responsible for checking the measurements and/or signatures of subsequent components either locally or by utilizing a piece of trusted hardware such as a TPM 112. Authenticated boot loaders may differ in practice by how they obtain their attestation root key, whether a root of trust for measurement/verification differs from the root of trust for attestation, and whether components are verified using a signature, in non-limiting examples, but are considered for purposes of this description secure or authenticated boot loaders. Attested computation may further rely upon secure microcode and/or a trusted software component, and/or secure signing enclaves, which are constructions that protect memory access from operating system level operations. Attested computation may rely upon wholly or in part on a measurement root, which computes a cryptographic hash of a trusted software component, and/or may generate a trusted software component attestation key pair and certificate based on the trusted software component's hash. In a representative embodiment, measurement root may read the processor key derivation secret and derive a symmetric or asymmetric key pair key based upon the trusted software component's hash. In an embodiment the measured root may utilize at least a processor key derivation secret to derive a symmetric or asymmetric key pair for decrypting a trusted software component and may include subsequent evaluation of the trusted software component. In an embodiment, the trusted software component may contain a header that contains the location of the attestation existence flag. In an embodiment, the measurement root may produce an attestation certificate by signing the trusted software component's private attestation key. The measurement root may generate a symmetric key or other cryptographic key for the trusted software component so it may encrypt its private attestation key and store it in untrusted memory. Attestation may be used to attest any computing process and/or datum, including without limitation sensor readout, attested time, attested geographical data such as without limitation global positioning system (GPS) data, and the like.

In an embodiment, secure computing module 108 and/or a computing device incorporating secure computing module 108 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 108 and/or computing device incorporating secure computing module 108 may append a cryptographic signature based upon any private key that may be associated with secure computing module 108 as described herein. Secure computing module 108 and/or computing device incorporating secure computing module 108 may operate a security reset of working memory prior to load of data for trusted computation; for instance, the secure computing module 108 and/or computing device incorporating secure computing module 108 may append a hash of the memory to cryptographic hash of system state following reset and prior to loading data. Secure computing module 108 and/or computing device incorporating secure computing module 108 may append its authentication signature of memory page tables and/or memory tables. Upon completion of the trusted computation, which may include execution of program code of system state, secure computing module 108 and/or computing device incorporating secure computing module 108 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 108. Secure computing module 108 and/or computing device incorporating secure computing module 108 may include a system to compute one or more hash trees of cryptographic hash of the computation, system state, and/or outputs; secure computing module 108 and/or computing device incorporating secure computing module 108 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still referring to FIG. 1, examples of a secure computing modules 108 may include, without limitation, TPM 112 as described above. The secure computing module 108 may include TPM 112 combined with a boot-measuring protocol using hash trees, Merkle trees, or the like to measure boot entries to create an "attested boot," additionally or separately from the attested computation description described above. A secure computing module 108 may include a trusted execution technology (TXT) module combining a TPM 112 with establishment of a secure container at run-time; secure container may be isolated from a software stack and OS of at least the transaction authentication node 104 and/or use TPM 112 to measure and attest to secure container prior to launch. Secure computing module 108 may implement a trusted enclave, also known as a trusted execution environment (TEE) or secure enclave. In an embodiment, a trusted enclave may be a portion of a computing device that is isolated from the main processor of the computing device. Isolation may be achieved using elements of secure computing module 108 as described above, including isolation of memory. Isolation of memory may be achieved through any process or architecture as described above for secure memory, including encryption using a cryptographic system a decryption and/or encryption key to which a secure processor 120 or TPM 112 has access, but to which a CPU or other main processor, as well as input/output devices or connections, does not and/or use of dedicated cache lines or the like to physically separate memory accessible to secure computing module 108 from CPU and/or input/output devices or connections. Inputs and outputs to and from trusted enclave may be restricted and controlled tightly by a secure processor 120 and/or TPM 112 as described above, including software security monitors. Trusted enclaves may be considered protected memory primitives in which the program stack and stack pointer are reset prior to loading of code into the enclave and flushed prior to exiting trusted enclave operation. In general trusted enclaves may be defined as hardware or software primitives that prohibit unauthorized access to memory segments during execution of sensitive code, including via access to processor caches. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. The Sanctum architecture and Ascend secure infrastructure from MIT, Ghostrider secure infrastructure, ARM TrustZone, Trusted Little Kernel (TLK) as promulgated by Nvidia Corporation of Santa Clara, Calif., and Secure Encrypted Virtualization (SEV) as promulgated by Advanced Micro Devices, Inc. of Santa Clara, Calif., RISC-V physical memory protection (PMP) based isolated software modules, OpenTitan hardware root of trust as promulgated by the LowRISC Foundation of Cambridge, UK, iLO hardware root of trust as promulgated by Hewlett Packard Enterprise of San Jose, Calif., USA, and/or any other suitable architecture. Persons skilled in the art, upon reviewing the entirety of this disclosure, will be aware of various additional or alternative trusted computing processes that may be used to implement secure computing module 108, TEE, or trusted enclaves as disclosed herein. System 100 may incorporate or communicate with a certificate authority (CA), public key infrastructure (PKI), distributed CA or distributed PKI.

In an embodiment, and continuing to refer to FIG. 1, secure computing module 108 may be implemented as a discrete component and/or subsystem of first device 104. Alternatively or additionally, secure computing module 108 may be implemented at least in part by configuration of one or more components of first device 104 to implement secure computing module 108 and/or a component or portion thereof. Secure computing module 108 may include any combination of discrete and/or isolated elements and/or components of first device 104 with any configuration of other components of first device 104 such as a CPU, GPU, MCU, an originating processor as described in further detail below, and/or any software and/or firmware operating thereon. Secure computing module 108 may, as a non-limiting example, be configured in any combination as described above to produce signatures, digital certificates, or any other function performed by secure computing module 108 as described in this disclosure.

With continued reference to FIG. 1, first device 104 is configured to receive an originating signature and an originating verification datum from an originating device 124. Originating device 124 may include any computing device as described below in reference to FIG. 4. Originating device 124 may include a single computing device operating independently, or may include two or more computing devices operating in concert, in parallel, sequentially or the like. Originating device 124 may incorporate, be in communication with, or otherwise utilize a secure computing module 108 as described above. Originating device 124 may include secure computing module 108, TPM 112, and/or PUF 116. Originating device 124 may include a device operated by a manufacturer of first device 104. Originating signature may include any digital signature as described herein. Originating verification datum may include any verification datum suitable for verifying originating signature.

With continued reference to FIG. 1, originating device 124 may communicate with first device 104. In an embodiment, originating device 124 may communicate with first device 104 through a communication network. Connection to communication network may include connection via a network interface card (e.g., a mobile network interface card, a LAN card), a modem, any other wired or wireless means usable for connection to a communication network, and/or any combination thereof. A communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used.

With continued reference to FIG. 1, originating device 124 may produce an originating signature, which as noted above may include any digital signature as described in this disclosure. Originating signature may include a hardware-generated secret. Originating signature may include a private key of a public/private key pair. Originating signature may include a secure proof of an originating device secret. In an embodiment, proof may not be secure; in other words, proof may include a one-time revelation of at least a secret, for instance as used in a single challenge-response exchange. Originating device secret may be specific to originating device 124; alternatively or additionally, originating device secret may include a group identifier and/or signature or secure proof generated by a group key and/or secret such as for example a shared secret. Group key may include any of the secret sharing schemes as described above.

With continued reference to FIG. 1, originating signature may be linked to an originating verification datum. Verification datum may be any datum that may be used to aid in evaluation of originating signature. For example, where originating signature includes a digital signature generated using a private key of a public key cryptographic system, verification datum may include a corresponding public key. Similarly, where originating signature includes a zero-knowledge proof, originating verification datum may include verification data useable to verify zero-knowledge proof. Linking of originating verification datum and originating signature may include having originating verification datum function as or be a portion of originating signature as described in more detail below. Originating verification datum may be utilized by originating device 124 for example, to verify originating signature. Verification may include checking a hash corresponding to originating verification datum as compared to a hash corresponding to originating signature as described in more detail below. Originating signature may be utilized to sign a message referencing first verification datum.

With continued reference to FIG. 1, first device 104 may be configured to generate a first anonymized signature set. First anonymized signature set may by generated by a digital signature scheme which may use first device 104 secret linked to first verification datum and originating signature linked to originating verification datum to link a particular secret to a particular device by an anonymous signature. First device 104 may generate a first anonymized signature set which may include a modified first verification datum linked to the first device 104 secret, a modified originating signature, and a modified originating verification datum based on the originating verification datum, whereby the modified originating verification datum verifies the modified originating signature, which may be performed according to any method or method steps as described below, in any combination or with any degree of repetition.

With continued reference to FIG. 1, first device 104 and/or originating device 124 may communicate with a second device 128. A second device 128 may include any of the devices as described in FIG. 4. A second device may be situated "upstream" from originating device 124 and/or first device 104; that is, a second device may provide signatures, verification data, or the like to originating device 124 and/or first device 104 according to any embodiment of any method or method step as described herein. A second device may be situated "downstream" from originating device 124 and/or first device 104; that is, a second device 128 may receive a verification datum, digital signature, or other element of data from originating device 124 and/or first device 104 as described in further detail below. As a non-limiting example, a second device 128 may receive modified first verification datum but may be unable to derive first verification datum from modified first verification datum, for instance as described in further detail below. Earlier device secrets and/or verification datums may not be privy to subsequent devices downstream in the attestation chain. For example, first device 104 may sign a message using first hardware-generated secret, which may be authenticated by first verification datum. A second signer, which may include originating device 124, may sign the message with originating signature which may be authenticated by originating verification datum thereby creating a modified verification datum and a modified originating signature. This process may, for instance, enable generation of novel secret keys using additional circuitry, to demonstrate, for instance, timeliness of execution and frustrate delay-based attacks.

Continuing to refer to FIG. 1, any of first device 104, originating device 124, and/or a second device 128 may be designed and/or configured to perform any method, method step, or sequence of method steps in any embodiment described in this disclosure, in any order and with any degree of repetition. For instance, Any of first device 104, originating device 124, and/or a second device 128 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Any of first device 104, originating device 124, and/or a second device 128 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In an embodiment, and still referring to FIG. 1, system 100 may include a signature listing. Signature listing may include any suitable data structure for storage and retrieval of data elements, including without limitation linked lists, hash tables, or the like. Signature listing may include a temporally ordered signature listing, which may include without limitation any embodiment of a temporally sequential listing described in U.S. Provisional Application 62/758, 367, which is incorporated by reference above.

With continued reference to FIG. 1, first device 104 may be designed and configured to receive an originating signature from an originating device 124 and an originating verification datum. The originating signature may include a secure proof of an originating device secret. The originating signature may sign a message referencing the first verification datum. The originating verification datum may verify the originating signature. First device 104 may generate a first anonymized signature set. The first anonymized signature set may include a modified first verification datum linked to first device 104. The first anonymized signature set may include a modified originating signature that may include a secure proof of the originating device secret. The modified originating signature may sign a modified first message referencing the modified first verification datum. The anonymized signature set may include a modified originating verification datum based on the originating verification datum, wherein the modified originating verification datum verifies the modified originating signature.

Figure 2:
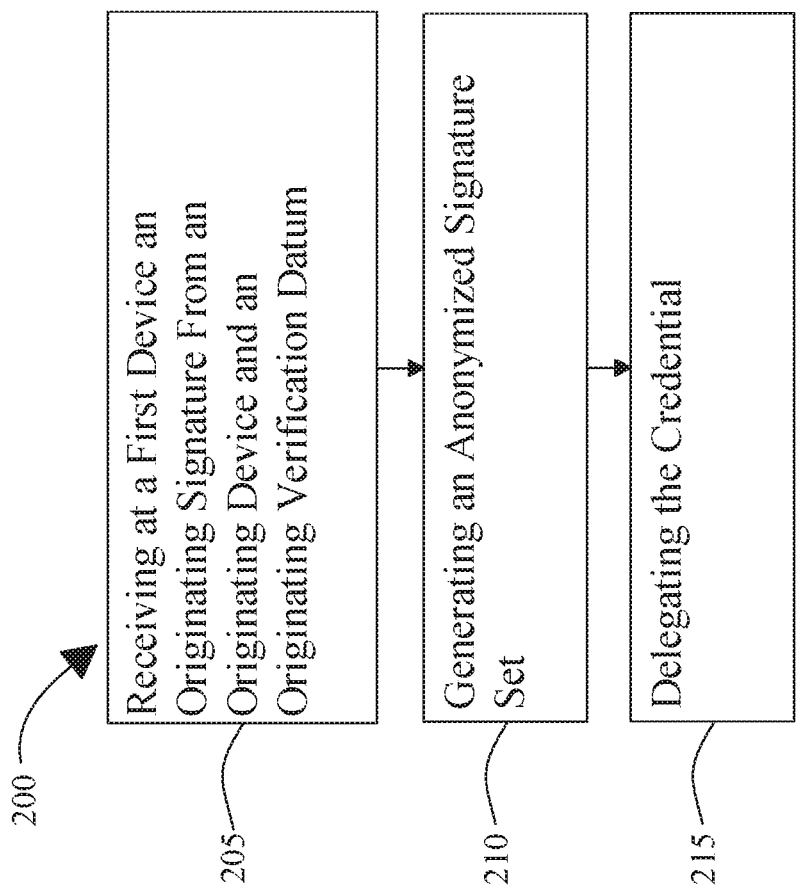
FIG. 2 is a flow diagram illustrating an exemplary embodiment of a method for implementing an anonymized attestation chain at a first device.

Referring now to FIG. 2, an exemplary embodiment of a method 200 of implementing an anonymized attestation chain at a first device 104 is illustrated. At step 205 first device 104, having a first hardware-generated secret and a first verification datum linked to the first hardware-generated secret, receives an originating signature and an originating verification datum from an originating device 124. First hardware-generated secret may include a hardware generated secret using hardware such as a secure computing module 108, trusted platform module, and/or physically unclonable function as described in more detail above in reference to FIG. 1. For example, first hardware-generated secret may include a secret generated using a physically unclonable function (PUF 116). PUF 116 may include any of the PUFS 116 as described above in reference to FIG. 1. First hardware-generated secret may include a private key of a public/private key pair. First hardware-generated secret may be usable to produce a secure proof as set forth in more detail below. First hardware-generated secret may include a secret verifiable by a group key as described above in reference to FIG. 1. First device 104 may receive an originating signature from an originating device 124 and an originating verification datum through a communication network. Connection to communication network may include any of the network topology using wired or wireless technology as described above in reference to FIG. 1.

With continued reference to FIG. 2, first verification datum is linked to first hardware-generated secret. First verification datum is any datum that may be used to aid in evaluation of first hardware-generated secret as described above in FIG. 1. Linking first verification datum to first hardware-generated secret may include having first verification datum function as or be a portion of first hardware-generated secret. For example, first hardware-generated secret may include a digital signature generated using a private key of a public key cryptographic system. In such an instance, first verification datum may include a corresponding public key used to evaluate and/or authenticate digital signature. In such an instance, public key used to evaluate and/or authenticate digital signature is linked whereby public key when presented in connection with private key evaluates and authenticates digital signature. In yet another non-limiting example, first hardware-generated secret may be used to generate a zero-knowledge proof. First verification datum may be linked to the zero-knowledge proof where first verification datum includes verification data useable to verify the zero-knowledge proof. In an embodiment, verification datum may be linked to a first hardware-generated secret associated with a group key as described in more detail above in FIG. 1. In such an instance, first verification datum may be linked to first hardware-generated secret shared by a plurality of devices, such as without limitation a lot of devices produced by a manufacturer. For example, manufacturer may assign first hardware-generated secret to a plurality of devices such as a specific lot of devices that may have first hardware-generated secret manufactured into each such device, for instance in the form of a hardware-based secret as set forth in further detail above in reference to FIG. 1.

With continued reference to FIG. 2, originating device 124 may include any device suitable for use as first device 104. As a non-limiting example, originating device 124 may include a device operated by a manufacturer of first device 104. Originating signature may include any embodiment of any signature as described above in reference to FIG. 1. For instance, and without limitation, originating signature may include a hardware-generated secret. Originating signature may be linked to originating verification datum. Originating verification datum may include any datum suitable for use as a first verification datum as described in further detail above. Originating signature may be generated, for example, using a private key of a public/private cryptographic key pair, and originating verification datum linked to originating signature may include a public key corresponding to the private key. Linking may include having originating verification datum function as or be a portion of originating signature. For example, originating signature may include a zero-knowledge proof, and originating verification datum may be linked whereby verification datum consists of verification data useable to verify zero-knowledge proof. Similarly, where originating signature includes a digital signature generated using a private key of a public/private cryptographic key pair, verification datum may include a corresponding public key.

With continued reference to FIG. 2, originating signature may include a secure proof of an originating device secret. Originating device secret may be any datum suitable for use as a first hardware-generated secret as described above. Secure proof may include any secure proof as described above in reference to FIG. 1. For example, and without limitation, secure proof may include a digital signature. Secure proof may be generated by any of the processes as described above in reference to FIG. 1 and/or according to any process for generation of a signature and/or anonymized signature set as described in this disclosure. As a non-limiting example, secure proof may include a secure proof generated from a hardware-based signature as described above.

With continued reference to FIG. 2, originating signature signs a message referencing first verification datum; as used herein, a message referencing first verification datum may include a message containing first verification datum, a message containing a datum having a mathematical relationship to first verification datum, such as without limitation a cryptographic hash generated from first verification datum, and/or a message containing a datum linked to first verification datum in a data structure or other element, such that a device evaluating message may be able to associate message with first verification datum. At least a credential may include, without limitation, any credential and/or authorization token as described in U.S. Provisional Application 62/758,367, incorporated by reference above, and/or in U.S. Provisional Patent Application Ser. No. 62/815,527, filed on Mar. 8, 2019, and titled "METHODS AND SYSTEMS FOR ANONYMOUS HARDWARE ATTESTATION," which is incorporated by reference herein in its entirety. Credential may be generated by originating device 124. Alternatively or additionally, credential may be delegated to originating device, for instance and without limitation according to any process for delegation of credentials as described in this disclosure. Originating signature may represent a latest signature in a chain of delegation operations and may be received with a set of verification data including a verification datum and/or modified verification datum for each operation of the chain of delegation operations, for instance as described in further detail below. Chain of delegations may include, as a non-limiting example, a signature performed by originating device using a hardware-based secret on originating device 124 and delegating credential to a software process operating on originating device 124, the software process having a process-specific secret and process-specific verification datum signed by the hardware-based secret; software process may produce an anonymized signature set, use a modified process-specific verification datum based on process-specific verification datum, and provide a modified hardware-specific verification datum, using anonymized signature sets as described above, delegating credential from hardware-specific key to software process to first device 104. As a further example, originating device may be delegated credential from, for instance, a distributed certificate authority as described above and/or in U.S. Provisional Application 62/758,367; a signature so delegating may further be anonymized, generating another modified verification datum, modified message, and modified signature. Generally, any number of such delegations, with or without anonymization, may be performed to generate a signature from originating device to first device, and additional verification data, potentially modified, may be provided with originating signature. First device 104 may not be able to identify originating device 124, particularly where originating signature is provided indirectly, for instance via signature listing as described in further detail below. Originating verification datum may be useable to verify originating signature according to any means and/or method for such verification as described above in reference to FIG. 1. Verification may include evaluation of originating signature. Where additional verification data and/or delegating signatures are present, each may be verified as well to authenticate an attestation chain so formed. A first signature at the beginning of the chain may be signed, without limitation, by a manufacturer and/or any certificate authority as described in this disclosure or in any disclosure incorporated by reference herein. In general, an initial signature of a chain may be evaluated for identification of a validly authorizing device and/or public key.

Still referring to FIG. 1, receiving the originating signature may include retrieving the originating signature from a signature listing. In an embodiment, retrieving originating signature from signature listing may include posting first verification datum and/or a verification datum linked to first hardware-generated secret to the signature listing, determining that originating device has signed the first verification datum at the signature listing and retrieving the originating signature from the signature listing.

With continued reference to FIG. 2, at step 210 first device 104 generates an anonymized signature set. Anonymized signature set enables process of attestation to be performed in which a digital signature and/or secure proof verifies that originating device 124 has identified first device 104 using the signature, without revealing the identity of first device 104 that originating device 124 was using. Anonymized signature set includes a modified first verification datum linked to first hardware-generated secret. Modified first verification datum may include first verification datum that has been altered according to one or more additional factors. For example, whereby first verification datum may include a public key used to evaluate secure proof such as a digital signature generated using a private key of a public key cryptographic system, modified first verification datum may include a new public key that may be used to evaluate the same private key of a public key cryptographic system. In such an instance, modified first verification datum is linked to first hardware-generated secret; in an embodiment, however, it may be impossible for a second device 128 to derive first verification datum cannot be derived from modified first verification datum. New public key and/or modified first verification datum may be usable to evaluate signature generated using a private key corresponding to first public key and/or first verification datum. In another non-limiting example, first hardware-generated secret consisting of zero-knowledge proof may be verified by first verification datum consisting of verification data. Anonymized signature set may be transmitted to a second device 128. A second device 128 may include any other device operating on system 100. In an embodiment, transmitting to a second device 128 the anonymized signature set may include generating by the first device, a first device signature and transmitting to a second device 128 the first device signature. First device signature may include a secure proof of the first hardware-generated secret. First hardware-generated secret may include any of the secrets as described above in FIGS. 1-2. Transmitting to a second device 128 may be performed using any of the wired or wireless network transmissions as described above in FIG. 1. First device signature which may include a secure proof of the first hardware-generated secret may sign a message referencing a second verification datum. Second verification datum may be linked to a second device 128 secret. A second device 128 secret may include any secret element of data not revealed to devices in general, such as without limitation a secret key or private key as described above. Transmitting to a second device 128 may include furthering the attestation chain. A second device 128 receives first hardware-generated secret and modified first verification datum that allows for verification of first hardware-generated secret as well as modified signature from originating device. A second device 128 receives proof of the attestation chain while the chain remains anonymous through subsequent modifications to first verification datum and first device signature. First device 104 may alter first verification datum to generate modified first verification datum consisting of new verification data that is able to verify first hardware-generated secret. First verification datum is unable to be derived from modified first verification datum because modifications made to first verification datum, thereby maintaining anonymity as to the identity of first device 104. However, both first verification datum and modified verification datum may attest to and authenticate first hardware-generated secret.

With continued reference to FIG. 2, anonymized signature set includes a modified originating signature. Modified originating signature may be altered in such a way so that originating signature cannot be derived from modified originating signature by a second device. This may include for example, generating a new digital, new zero-knowledge proof or the like, using first originating signature. In an embodiment, modified originating signature may include a secure proof of originating device secret. Secure proof may include any of the secure proofs such as digital signatures as described above in reference to FIGS. 1-2. Secure proof may be generated by any of the protocols and methods as described above in reference to FIGS. 1-2. Modified originating signature signs a modified first message referencing modified first verification datum. Modified first message may be altered in a way so that first message cannot be derived from modified first message by a second device. For example, first message may be represented as specific cryptographic hash containing a unique mathematical representation of contents of first message. Modified first message may be altered by first device 104 in such a way so that a new unique hash corresponding to new contents of modified first message is produced. Thus, alterations to first message to produce modified first message result in a new unique hash wherein first message cannot be derived from modified first message by a second device With continued reference to FIG. 2, anonymized signature set includes a modified originating verification datum based on the originating verification datum wherein the modified originating verification datum verifies the modified originating signature. For example, where originating verification datum includes a public key used to evaluate secure proof such as a digital signature generated using a private key of a public key cryptographic system, modified originating verification datum may include a new public key that may be used to evaluate a modified originating signature created using same private key of a public key cryptographic system. Modified originating verification datum may be altered in such a way so that originating verification datum cannot be derived from modified originating verification by a second device. Verification may include evaluation of modified originating signature by modified originating verification datum. This may include decrypting the encrypted mathematical representation of a modified originating signature that is a digital signature and using the corresponding public key and comparing the decrypted representation to a purported match that was not encrypted as described in more detail above. Verification may also include calculating confidence levels relating to modified originating signature by modified originating verification datum as described in more detail above. Confidence levels may be calculated based on various factors such as history of past interactions, and/or aggregate calculations of confidence level as described in more detail above.

Still referring to FIG. 2, at step 215, first device delegates the at least a credential to a second verification datum. Delegation may be performed in any manner suitable for delegation of a credential as described in this disclosure, including without limitation generating a second message conferring the credential to the second verification datum and digitally signing the second message using the first device hardware secret. Second verification datum may be linked to a software process operating on first device Second verification datum maybe linked to a second device, for instance by being linked to a hardware-generated secret of second device. First device 104 may retrieve second verification datum from a signature listing, for instance as described above. First device 104 may convey signature, a verification datum associated with hardware-generated secret of first device 104 and/or an anonymized version thereof, to a second device 128, including without limitation a second device 128 to which first device 104 is delegating a credential, and/or on which a process to which first device 104 is delegating credential is operating. Alternatively or additionally, first device 104 may post delegation signature to signature listing. Second device 128 may further perform any method step described above, including further delegation.

Still referring to FIG. 2, delegation of credential from hardware-generated secret of first device 104 to another verification datum may occur before or after receiving originating signature. For instance, and without limitation, first device 104 may delegate any credential of a given category in possession of first device 104, such as a credential permitting access to a network resource, process, device, and/or element of data, prior to receiving such credential. Each delegation performed in an attestation chain may be posted to signature listing in some embodiments, permitting traversal and/or verification of attestation chain by any device having access thereto.

Figure 3:
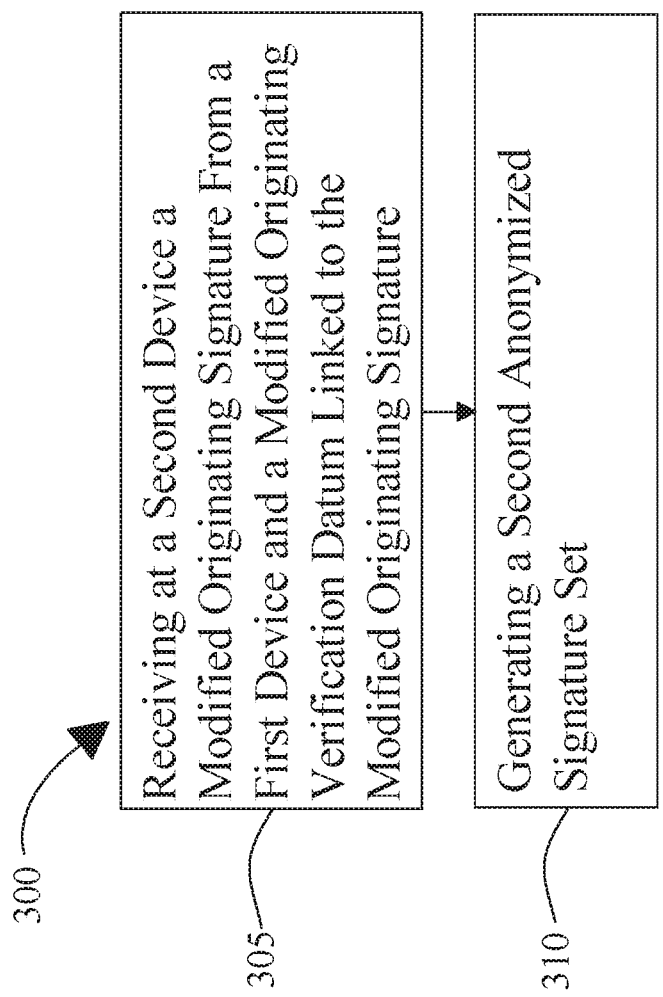
FIG. 3 is a block diagram illustrating an exemplary embodiment a method for implementing an anonymized attestation chain at a second device.

Referring now to FIG. 3, an exemplary embodiment of a method 300 of implementing an anonymized attestation chain using a second device 128 upstream from originating device 124 is illustrated. At step 305 first device may receive a second signature and a second verification datum from a second device 128. Second signature may include a secure proof of a second device secret. Second device secret may include a hardware generated secret using hardware such as a secure computing module 108, trusted platform module, and/or physically unclonable function. Second device secret may include a private key of a public/private key pair. Second device secret may be usable to produce a secure proof. Secure proof may include any of the secure proof as described above in FIGS. 1-2. Secure proof representing second device secret may be generated using any of the protocols as described above in FIGS. 1-2. Second device secret may be device-specific or may be issued to a group of devices and may be a group key as described in more detail above. Second verification datum may include any datum that may be used to aid in evaluation of second device secret. For example, where a second device 128 secret includes a digital signature generated using a private key of a public key cryptographic system, second verification datum may include a corresponding public key. Second signature may sign a message referencing the originating verification datum. Originating verification datum may include any of the originating verification data as described above in FIG. 112. Signing message referencing the originating verification datum may include referencing originating verification datum. Second verification datum may verify second signature. Verification may include evaluation of second signature. Signature may be verified by decrypting the encrypted mathematical representation using the corresponding public key and comparing the decrypted representation to a purported match that was not encrypted as described in more detail above in FIGS. 1-2.

With continued reference to FIG. 3, generating anonymized signature set may include generating a modified originating verification datum linked to the originating device secret. Modified originating verification datum may include any of the modified originating verification data as described in more detail above in FIGS. 1-2. Modified originating verification datum may be linked to originating device secret. Linking may include having modified originating verification datum function as or be a portion of originating device secret as described in more detail above. Generating anonymized signature set includes generating a modified second signature wherein the modified second signature includes a secure poof of the second device secret and the modified second signature signs a message referencing the modified originating verification datum. Modified second signature may include any of the modified second signatures as described in more detail above. Modified second signature may sign a message referencing the modified originating verification datum as described in more detail above. Modified originating verification datum may include any of the modified originating verification datums as described in more detail in FIGS. 1-2. Generating the anonymized signature set includes generating a modified second verification datum based on the second verification datum wherein the modified second verification datum verifies the modified second device signature. Modified second verification datum may include second verification datum that has been altered by adding or subtracting one or more factors. Modified second device signature may include first device signature that has been altered by adding or subtracting one or more factors. Verification may include evaluation of second signature. Signature may be verified by decrypting the encrypted mathematical representation using the corresponding public key and comparing the decrypted representation to a purported match that was not encrypted as described in more detail above in FIGS. 1-2.

In an embodiment, and continuing to refer to FIG. 2, one or more devices in an attestation chain may be "unmasked" by an upstream device; unmasking may include, without limitation, revelation of an original unmodified signature, message, and/or verification datum that was issued to a "downstream" device. This may have the effect of reversing anonymization generated by modification of signature, message, and/or verification data as described above. For instance, and without limitation, an upstream device may retain a copy and/or identification of a signature to a downstream device and/or verification datum, which signature may have been anonymized; upstream device may publish, post to a temporally sequential listing or other distributed data structure, and/or provide to a requesting device an identity of the downstream device and/or verification datum, for instance in response to a court order and/or a determination that one or more devices in attestation chain or chains has been compromised and/or misused. In an embodiment, where signature is a multisignature and/or threshold signature, for instance as described in this disclosure, any upstream device signing the multisignature and/or threshold signature may reveal an identity of a downstream device and/or verification datum signed. Alternatively or additionally, where a verification of a group signature and/or group key was signed, all verification data of group key may be published and/or provided, and/or a particular verification datum of group key that has been signed may be published.

As a non-limiting example, and for illustrative purposes, one or more steps of method 200 and/or method 300 may be performed using mercurial signatures. In a delegable anonymous credential system, participants may use their credentials anonymously as well as anonymously delegate them to other participants. Such systems may be more usable than traditional anonymous credential systems because a popular credential issuer can delegate some of its responsibilities without compromising users' privacy. They may also provide stronger privacy guarantees than traditional anonymous credential systems because the identities of credential issuers are hidden. An identity of a credential issuer may convey information about a user's identity even when all other information about the user is concealed. Other previously known constructions of delegable anonymous credentials were prohibitively inefficient. They were based on non-interactive zero-knowledge (NIZK) proofs. Included herein is a simple construction of delegable anonymous credentials. In an embodiment, only five group elements may be needed per link to represent an anonymous credential chain. In an embodiment, and a as a non-limiting example, a main building block may include a mercurial signature, which allows a signature a on a message M under public key $p_k$ to be transformed into a signature $\sigma^1$ on an equivalent but unlinkable message $M^1$ under an equivalent but unlinkable public key $pk^1$.

Anonymous credentials may allow a user to prove possession of a set of credentials, issued by some trusted issuer or issuers, that allow access to a resource. What makes them anonymous may be that the user's proof is zero-knowledge and credentials may be obtained anonymously: an issuer need not know the user's identity in order to issue a credential Traditional anonymous credential models may assume that the verifying party, such as an access provider, knows the public key of the credential issuer or issuers. In an embodiment, this may reveal a lot of information about a user. In the US, for example, the identity of the issuer of a user's driver's license (the local DMV) might reveal the user's zip code. If, in addition, the user's date of birth and gender are leaked (as could happen in the context of a medical application), this may be enough to uniquely identify the user the majority of the time. As potential approach to correct this, instead of proving possession of a credential from a particular issuer (a particular DMV), a user may prove possession of a credential from one issuer out of a long list. This simple solution may be undesirable for two reasons: (1) it incurs a significant slowdown, proportional to the number of potential issuers, and (2) it requires the user herself to know who the issuer is. A more promising approach may utilize delegable anonymous credentials. In an embodiment, a non-anonymous delegable credential scheme may be constructed as follows: A certification chain may be rooted at some authority and ends at a public key of a user in question, who then needs to demonstrate that she knows the corresponding secret key to prove that she is authorized. In an embodiment, the trusted authority may issue certificates directly to each user (so the length of each certification chain is 1). This may be inconvenient because it requires the authority to do too much work. A system in which the authority delegates responsibility to other entities may be convenient: an entity with a certification chain of length l can issue certification chains of length l+1. A conventional signature scheme may allow delegable credentials. For example, Alice, who has a public signing key $pk_A$ and a certification chain of length l, can sign Bob's public key $pk_B$, which gives Bob a certification chain of length l+1. Delegable anonymous credentials may allow users to enjoy more privacy. In an embodiment, users themselves may not know the actual identities of the links on their certification chains. For example, consider a discount program for senior citizens. An online shopper may prove that she is eligible for a discount by presenting a level-3 credential from a government administering the program. Government official Alice may receive a credential directly from the government. Alice may give a credential to a local grocer, Bob, who does not need to know who Alice is or to whom she has issued credentials. Bob's job may be to issue credentials to his customers who are senior citizens and he gives such a credential to Carol. Carol need not know who Bob is, who gave him the credential, or who else received credentials from him. Now Carol may use her credential to shop online with a discount. Carol's credential does not reveal the identity of anyone on her credential chain. Thus, if Bob issues a discount credential to no other customer, Carol's anonymity may still be preserved. Delegable anonymous credentials (DACs) may include a proof of concept construction based on non-interactive zero-knowledge (NIZK) proof systems for NP. Their construction incurred a blow-up that was exponential in L, the length of the certification chain. Even for constant L it was not meant for use in practice. In an embodiment, a commitment scheme and a signature scheme that "play nicely" with randomizable NIZK, DACs with only linear dependency on L could be achieved. This may include using Groth-Sahai commitments and an NIZK proof system.

In an embodiment, a delegable anonymous credential system may utilize groups with bilinear pairings; only five group elements per level of delegation may be needed to represent a credential chain (i.e. if Alice obtains a credential from the certification authority (CA) and delegates it to Bob, who in turn delegates it to Carol, Carol's credential chain may be represented using fifteen group elements.) A main building block of this exemplary construction may include a signature scheme, which may be referred to as a mercurial signature scheme. Given a mercurial signature a on a message M under public key pk, it may be possible, without knowing the underlying secret key sk, to transform it into a new signature $\sigma^1$ on an equivalent message $M^1$ under an equivalent public key $pk^1$, for some set of equivalence relations on messages and public keys. Moreover, for an appropriate choice of message space and public key space, this may be done in such a way that the new $M^1$ cannot be linked to the original M, and the new public key $pk^1$ cannot be linked to pk. This approach to constructing DACs from mercurial signatures may be implemented as follows: In an embodiment, the certification authority (CA) with public key $pk_0$ has issued a credential to Alice, whose pseudonym is some public key $pk_A$. Alice's certification chain (of length l) will may have the form $(pk_A, \sigma_A)$, where $\sigma_A$ is the CA's signature on $pk_A$. Alice may interact with Bob, who knows her under a different public key, $pk^1_A$. Public keys $pk_A$ and $pk^1_A$ may be equivalent—in other words, they both may belong to Alice and have the same underlying secret key—but Bob may be unable to link them. Mercurial signatures may allow her to translate $\sigma_A$ into $\sigma^1_A$, which may be the CA's signature on her $pk^1_A$. Alice may delegate her credential to Bob, after which Bob's certification chain may have the form $((pk^1_A, pk_B), (\sigma^1_A, \sigma_B))$, where $pk_B$ is the pseudonym under which Bob is known to Alice, and $\sigma_B$ is the signature on $pk_B$ under the public key $pk^1_A$. Now suppose that Bob wants to delegate to Carol, who is known to him under the pseudonym $pk_C$. He first may use the properties of the mercurial signature scheme in order to make his credential chain unrecognizable. He may transform $pk^1_A$ into an equivalent $pk^{11}_A$ and $pk_B$ into an equivalent $pk^{11}_B$, taking care to also transform the signatures appropriately. Finally, he may sign $pk_C$ under $pk^{11}_B$. A mercurial signature may have the property that a signature on a message M can be transformed into one on an equivalent message $M^1$, where $M^1$ cannot be linked to M. It also may present a construction of SPS-EQ that is secure in the generic group model. In an embodiment, the above notion of security requires that the adapted construction is still unforgeable even when the forger is given the added freedom to modify the public key. In addition, it may require that proof that $pk_A$ and $pk^1_A$ are unlinkable even when given signatures under these keys.

The following is an exemplary definition of a mercurial signature, and related concepts, which is included for exemplary purposes only. The ensuing description should not be read as the sole manner of achieving mercurial signatures nor delegable anonymous credentials but is presented in direct language for the purposes of clarity and brevity; formulas, definitions, and theorems are included for exemplary purposes and to illustrate potential implementations but are not intended to be limiting. For a relation R over strings, let $[x]_R = \{y | R(x, y)\}$. If R is an equivalence relation, then $[x]_R$ denotes the equivalence class of which x is a representative. In an embodiment, a relation R is parameterized if it is well-defined. For example, if G is a cyclic group with generators g and h, then the decisional Diffie-Hellman (DDH) relation $R = \{(x, y) | \exists \alpha \text{ such that } x = g^\alpha \wedge y = h^\alpha\}$ is parameterized by G, g, and h and is well-defined as long as G, g, and h are well-defined. A mercurial signature scheme for parameterized equivalence relations $R_M, R_{pk}, R_{sk}$ is a tuple of the following polynomial-time algorithms, which are deterministic algorithms unless otherwise stated:

PPGen($1^k$)→PP: On input the security parameter $1^k$, this probabilistic algorithm outputs the public parameters PP. This includes parameters for the parameterized equivalence relations $R_M, R_{pk}, R_{sk}$ so they are well-defined. It also includes parameters for the algorithms sample$_\rho$ and samples$_\mu$, which sample key and message converters, respectively.

KeyGen(PP, l)→(pk,sk): On input the public parameters PP and a length parameter l, this probabilistic algorithm outputs a key pair (pk,sk). The message space M is well-defined from PP and l. This algorithm also defines a correspondence between public and secret keys: we write (pk,sk)∈KeyGen(PP, l) if there exists a set of random choices that KeyGen could make that would result in (pk,sk) as the output.

Sign(sk, M)→σ: On input the signing key sk and a message M∈M, this probabilistic algorithm outputs a signature σ.

Verify(pk, M, σ)→0/1: On input the public key pk, a message M∈M, and a purported signature σ, output 0 or 1.

ConvertSK(sk, ρ)→sk~: On input sk and a key converter ρ∈sample$_\rho$, output a new secret key sk~∈$[sk]R_{sk}$.

ConvertPK(pk, ρ)→pk~: On input pk and a key converter ρ∈sample$_\rho$, output a new public key pk~∈$[pk]R_{pk}$ (correctness of this operation, defined below, will guarantee that if pk corresponds to sk, then pk~ corresponds to sk~=ConvertSK(sk, ρ).)

ConvertSig(pk, M, σ, ρ)→σ~: On input pk, a message M∈M, a signature σ, and key converter ρ∈sample$_\rho$, this probabilistic algorithm returns a new signature σ~ (correctness of this will require that whenever Verify(pk, M, σ)=1, it will also be the case that Verify(pk~, M, σ~)=1.)

ChangeRep(pk, M, σ, ρ)→($M^1, \sigma^1$): On input pk, a message M∈M, a signature σ, and a message converter μ∈sample$_\mu$, this probabilistic algorithm computes a new message $M^1 \in [M]_{R_M}$ and a new signature $\sigma^1$ and outputs ($M^1, \sigma^1$) (correctness of this will require that Verify(pk, M, σ)=1=Verify(pk, $M^1, \sigma^1$)=1.)

Similar to a standard cryptographic, a mercurial signature must be correct and unforgeable. Definition 2 (Correctness) A mercurial signature scheme (PPGen, KeyGen, Sign, Verify, ConvertSK, ConvertPK, ConvertSig, ChangeRep) for parameterized equivalence relations $R_M, R_{pk}, R_{sk}$ is correct if it satisfies the following conditions for all k, for all PP∈PPGen($1^k$), for all l>1, for all (pk,sk)∈KeyGen(PP, l):

Verification For all M∈M, for all σ∈Sign(sk, M), Verify (pk, M, σ)=1.

Key conversion for all ρ∈sample$_\rho$, (ConvertPK(pk, ρ), ConvertSK(sk, ρ))∈KeyGen(PP, l). Moreover, ConvertSK(sk, ρ)∈$[sk]R_{sk}$ and ConvertPK(pk, ρ)∈$[pk]R_{pk}$.

Signature conversion for all M∈M, for all σ such that Verify(pk, M, σ)=1, for all ρ∈sample$^\rho$, for all σ~∈ConvertSig(pk, M, σ, ρ), Verify(ConvertPK (pk, ρ), M, σ~)=1.

Change of message representative for all M∈M, for all a such that Verify(pk, M, σ)=1, for all μ∈sample$_\mu$, Verify (pk, M, $\sigma^1$)=1, where ($M^1, \sigma^1$)=ChangeRep(pk, M, σ, μ). Moreover, $M^1 \in [M]_{R_M}$.

As an intuitive matter, in the instant example, correct verification may be the standard correctness property for signature schemes. Correct key conversion means that if the same key converter ρ is applied to a valid key pair (pk,sk), the result is a new valid key pair (pk~, sk~) from the same pair of equivalence classes. Correct signature conversion means that if the same key converter ρ is applied to a public key pk to obtain pk~ and to a valid signature σ on a message M to obtain σ~, then the new signature σ~ is a valid signature on the same message M under the new public key pk~. Finally, correct change of message representative ensures that if a message converter μ is applied to a valid message-signature pair (M, σ), the result is a new valid message-signature pair ($M^1$, $\sigma^1$), where the new message $M^1$ is in the same equivalence class as M.

Definition 3 (Unforgeability) A mercurial signature scheme (PPGen, KeyGen, Sign, Verify, ConvertSK, ConvertPK, ConvertSig, ChangeRep) for parameterized equivalence relations $R_M$, $R_{pk}$, $R_{sk}$ is unforgeable if for all polynomial-length parameters l(k) and all probabilistic, polynomial-time (PPT) algorithms A having access to a signing oracle, there exists a negligible function v such that:

$r[\text{PP} \leftarrow \text{PPGen}(1^k); (pk,sk) \leftarrow \text{KeyGen}(\text{PP}, l(k));$
$(Q, pk^*, M^*, \sigma^*) \leftarrow$ $A^{\text{Sign}(sk, \cdot)}(pk)$: $\forall M \in Q, [M^*]_{RM} \neq [M]_{RM} \wedge [pk^*]^{Rpk} = [pk]_{Rpk}$ $\wedge \text{Verify}(pk^*, M^*, \sigma^*) = 1] \leq v(k)$ where Q is the set of queries that A has issued to the signing oracle.

The unforgeability property here may be similar to existential unforgeability (EUFCMA) for signature schemes, except the adversary's winning condition may be somewhat altered. As in the EUF-CMA game, the adversary is given the public key pk and is allowed to issue signature queries to the oracle that knows the corresponding secret key sk. Eventually, the adversary outputs a public key pk, a message $M^*$, and a purported signature $\sigma^*$. Unlike the EUF-CMA game, the adversary has the freedom to choose to output a forgery under a different public key $pk^*$, as long as $pk^*$ is in the same equivalence class as pk. This seemingly makes the adversary's task easier. At the same time, the adversary's forgery is not valid if the message $M^*$ is in the same equivalence class as a previously queried message, making the adversary's task harder. The above definitions may formally relate to the standard definitions of existential unforgeability and correctness for signature schemes as follows. Suppose the relations $R_M$, $R_{pk}$, $R_{sk}$ are equality relations (recall that R is an equality relation if (a, b)∈R⇔a=b.) Let ConvertSK, ConvertPK, ConvertSig, ChangeRep be algorithms that do nothing but simply output their input sk, pk, σ, (M, σ), respectively. Then, it is easy to see that (PPGen, KeyGen, Sign, Verify) is a correct and existentially unforgeable signature scheme if and only if the mercurial signature scheme (PPGen, KeyGen, Sign, Verify, ConvertSK, ConvertPK, ConvertSig, ChangeRep) for $R_M$, $R_{pk}$, $R_{sk}$ is correct and unforgeable. In a structure preserving signature on equivalence classes SPS-EQ signature for an equivalence relation $R_M$, the ChangeRep algorithm may be present, but there may be no ConvertSK, ConvertPK, ConvertSig algorithms. The correctness requirement may boil down to correct verification and correct change of message representative requirements. Unforgeability of SPS-EQ may be similar to unforgeability of mercurial signatures, except that A does not have the freedom to pick a different public key $pk^*$; the forgery must verify under the original public key pk. A more formal relation of definitions to the definitions of existential unforgeability and correctness for signatures on equivalence classes may be as follows: Suppose the relations $R_{pk}$ and $R_{sk}$ are equality relations. Let ConvertSK, ConvertPK, ConvertSig be algorithms that do nothing but simply output their input sk, pk, σ, respectively. Then, (PPGen, KeyGen, Sign, Verify, ChangeRep) is a correct and unforgeable signature scheme for the equivalence relation $R_M$ if and only if the mercurial signature scheme (PPGen, KeyGen, Sign, Verify, ConvertSK, ConvertPK, ConvertSig, ChangeRep) for $R_M$, $R_{pk}$, $R_{sk}$ is correct and unforgeable. Class- and origin-hiding of mercurial signatures. It is important for the application in the instant example that the relations $R_M$ and $R_{pk}$ be class-hiding. Class-hiding for messages means, for the purposes of this example, that given two messages, $M_1$ and $M_2$, it should be hard to tell whether or not $M_1 \in [M_2]_{RM}$. Class-hiding for public keys means that, given two public keys, $pk_1$ and $pk_2$, and oracle access to the signing algorithm for both of them, it is hard to tell whether or not $pk_1 \in [pk_2]_{Rpk}$. An additional property that may be necessary for application in the instant example is that, even if $pk^*$ is adversarial, a message-signature pair obtained by running ChangeRep($pk^*$, $M_0$, $\sigma_0$, $\mu_0$) is distributed the same way as a pair obtained by running ChangeRep($pk^*$, $M_1$, $\sigma^1$, $\mu_1$), as long as $M_0$ and $M_1$ are in the same equivalence class. Thus, seeing the resulting message-signature pair hides its origin, whether it came from $M_0$ or $M_1$. Similarly, even for an adversarial $pk^*$, a signature on a message M output by ConvertSig hides whether ConvertSig was given $pk^*$ as input or another pk in the same equivalence class.

A mercurial signature scheme (PPGen, KeyGen, Sign, Verify, ConvertSK, ConvertPK, ConvertSig, ChangeRep) for parameterized equivalence relations $R_M$, $R_{pk}$, $R_{sk}$ is class-hiding if it satisfies the following two properties:

Message class-hiding: For all polynomial-length parameters l(k) and all probabilistic polynomial-time (PPT) adversaries A, there exists a negligible v such that:

$Pr[\text{PP} \leftarrow \text{PPGen}(1^k); M_1 \leftarrow M; M^0_2 \leftarrow M; M^1_2 \leftarrow [M_1]_{RM};$ $b \leftarrow \{0,1\}; b_1 \leftarrow A(\text{PP}, M, M^b_2): b^1 = b] \leq 1/2 + v(k)$ Public key class-hiding:

For all polynomial-length parameters l(k) and all PPT adversaries A, there exists a negligible v such that:

$Pr[\text{PP} \leftarrow \text{PPGen}(1^k); (pk_1, sk_1) \leftarrow \text{KeyGen}(\text{PP}, l(k));$ $(pk^0_2, sk^0_2) \leftarrow \text{KeyGen}(\text{PP}, l(k));$ $\rho \leftarrow \text{sample}_\rho(\text{PP}); pk^1_2 = \text{ConvertPK}(pk_1, \rho); sk^1_2 = \text{ConvertSK}(sk_1, \rho);$ $b \leftarrow \{0,1\}; b^1 \leftarrow A \text{ Sign}^{(sk1, \cdot), \text{Sign}(skb2, \cdot)}(pk_1, pk^b_2):$
$b^1 = b] \leq 1/2 + v(k)$ A mercurial signature is also origin-hiding if the following two properties hold:

Origin-hiding of ChangeRep: For all k, for all PP∈PPGen ($1^k$), for all $pk^*$ (in particular, adversarially generated ones), for all M, σ, if Verify($pk^*$, M, σ)=1, if $\mu \leftarrow \text{sample}_\mu$, then ChangeRep($pk^*$, M, σ, μ) outputs a uniformly random $M^l \in [M]_{RM}$ and a uniformly random $\sigma^l \in \{\hat{\sigma} | \text{Verify}(pk^*, M^l, \hat{\sigma})=1\}$.

Origin-hiding of ConvertSig: For all k, for all PP∈PPGen ($1^k$), for all $pk^*$ (in particular, adversarially generated ones), for all M, σ, if Verify($pk^*$, M, σ)=1, if $\rho \leftarrow \text{sample}_\rho$, then ConvertSig($pk^*$, M, σ, ρ) outputs a uniformly random $\tilde{\sigma} \in \{\hat{\sigma} | \text{Verify}(\text{ConvertPK}(pk^*, \rho), M, \hat{\sigma})=1\}$, and ConvertPK($pk^*$, ρ) outputs a uniformly random element of $[pk^*]_{Rpk}$ if $\rho \leftarrow \text{sample}_\rho$.

Construction of Mercurial Signatures Let e: $G_1 \times G_2 \rightarrow G_T$ be a Type III bilinear pairing for multiplicative groups $G_1$, $G_2$, and $G_T$ of prime order p. Let P, $\hat{P}$ and e(P, $\hat{P}$) be generators, respectively. The message space for our mercurial signature scheme will consist of vectors of group elements from $G^*_1$, where $G^*_1 = G_1 \setminus \{1_{G1}\}$. The space of secret keys will consist of vectors of elements from $Z^*_p$. The space of public keys, similar to the message space, will consist of vectors of group elements from $G^*_2$. Once the prime p, $G^*_1$, $G^*_2$, and l are well-defined, the equivalence relations of interest to us are as follows:

$R_M = \{(M,M^1) \in (G^*_1)^l \times (G^*_1)^l | \exists r \in Z^*_p \text{ such that } M^1 = M_r\}$ $R_{sk} = \{(sk,sk^\sim) \in (Z^*_p)^l \times (Z^*_p)^l | \exists r \in Z^*_p \text{ such that } sk^\sim = sk^r\}$ $R_{pk} = \{(pk,pk^\sim) \in (G^*_2)^l \times (G^*_2)^l | \exists r \in Z^*_p \text{ such that } pk^\sim = pk^r\}$ Note that messages, secret keys, and public keys are restricted to vectors consisting of only non-identity group elements. Without this restriction and the restriction that r≠0, the resulting relation would not be an equivalence one. We introduce our mercurial signature construction with message space $(G^*_1)^l$, but a mercurial signature scheme with message space $(G^*_2)^l$ can be obtained by simply switching $G^*_1$ and $G^*_2$ throughout.

PPGen($1^k$)→PP: Compute BG←BGGen($1^k$). Output PP=BG=($G_1$, $G_2$, $G_T$, P, P^, e). Now that BG is well-defined, the relations $R_M$, $R_{pk}$, $R_{sk}$* are also well-defined. sampleρ and sampleμ are the same algorithm, namely the one that samples a random element of $Z^*_p$.

KeyGen(PP, l)→(pk,sk): For 1≤i≤l, pick $x_i$←$Z^*_p$ and set secret key sk=($x_1$, ..., $x_l$). Compute public key pk=(X^$_1$, ..., X^$_l$), where X^$_i$=P^$xi$ for 1≤i≤l Output (pk,sk).

Sign(sk, M)→σ: On input sk=($x_1$, ..., $x^l$) and M=($M_1$, ..., $M_l$)∈$(G^*_1)^l$, pick a random y←$Z^*_p$ and output σ=(Z, Y, Y^), where Z←$(\Pi^l_{i=1} M^{xi}_i)^y$, Y←$P^{1/y}$, and Y^←$P^{\wedge 1/y}$.

Verify(pk, M, σ)→0/1: On input pk=(X^$_1$, ..., $X_{[<]$ BEGINITALml}), M=($M_1$, ..., $M_l$), and σ=(Z, Y, Y^), check whether $\Pi^l_{i=1}$ e($M_i$, X^$_i$)=e($M_i$, X^$_i$)=e(Z, Y^)^e (Y, P^)=e(P,Y^). If it holds, output 1; otherwise, output 0.

ConvertSK(sk, ρ)→sk^~: On input sk=($x_1$, ..., $x_l$) and a key converter ρ∈$Z^*_p$, output the new secret key sk^~=sk^ρ.

ConvertPK(pk, ρ)→pk^~: On input pk=(X^$_1$, ..., X^$_l$) and a key converter ρ∈$Z^*_p$, output the new public key pk^~=pk^ρ.

ConvertSig(pk, M, σ, μ)→σ^~: On input pk, message M, signature σ=(Z, Y, Y^), and key converter ρ∈$Z^*_p$, sample φ←$Z^*_p$. Output σ^~=($Z^{6104\, \rho}$, $Y^{1/\psi}$, $Y^{\wedge 1/\psi}$).

ChangeRep(pk, M, σ, μ)→($M^1$, σ^1): On input pk, M, σ=(Z, Y, Y^), μ∈$Z^*_p$, sample ψ←$Z^*_p$. Compute $M^1=M^\mu$, $\sigma^1=(Z^{\psi\mu}, Y^{\wedge 1/\psi}, Y^{\wedge 1/\psi})$. Output ($M^1$, $\sigma^1$).

Theorem 1 (Correctness) The construction described above is correct.

Theorem 2 (Unforgeability) The construction described above is unforgeable in the generic group model for Type III bilinear groups. To prove unforgeability, we construct a reduction to the unforgeability of the SPS-EQ signature scheme. Suppose a PPT algorithm A produces a successful forgery (M*, σ*, pk*) for a mercurial signature scheme with non-negligible probability. Then, by definition, there exists some α in $Z^*_p$ such that pk*=αpk, where pk is the challenge public key for unforgeability of SPS-EQ. In an embodiment, a PPT reduction B is able to obtain this α and produce a successful forgery (αM*, σ*, pk) for the SPS-EQ scheme, contradicting its proven security in the generic group model.

Theorem 3 (Class-hiding) The construction described above is class-hiding in the generic group model for Type III bilinear groups. Message class-hiding follows from message class-hiding of the SPS-EQ scheme. Specifically, $(G^*_i)^l$ is a class-hiding message space if and only if the decisional Diffie-Hellman assumption (DDH) holds in $G_i$. In an embodiment, for public key class-hiding, we must show that an adversary's view in a game in which the challenger computes independent public keys $pk_1 = (x_i^{(1)} X^{\wedge})_{i \in [l]}$ and $pk_2 = (x_i^{(2)} X^{\wedge})_{i \in [l]}$ (Game 0) is the same as his view in a game in which $pk_2 = \alpha pk_1 = (\alpha x^{(1)} X^{\wedge})_{i \in [l]}$ for some $\alpha \in Z^*_p$ (Game 3). This may be achieved by constructing two intermediate games (Game 1 and Game 2). In Game 1, $pk_1$ and $pk_2$ are independent, but C's responses to A's group oracle and signing queries are computed as formal multivariate Laurent polynomials in the variables $x^{(1)}_1, \ldots, x^{(1)}_l, x^{(2)}_1, \ldots, x^{(2)}_l$, $y_1, \ldots y_q$, where $y_i$ is the secret value the challenger uses for the $i^{th}$ Sign query. In Game 2, $pk_2 = \alpha pk_1$ for some $\alpha \in Z^*_p$, and C's responses to the oracle queries are again computed as formal multivariate Laurent polynomials, but now in the variables $x^{(1)}_1, \ldots, x^{(1)}_l, y_1, \ldots y_q$, and α. Demonstrating that A's view is the same in Game 0 as it is in Game 1 is a direct application of the Schwartz-Zippel lemma, which guarantees that the probability that a formal polynomial in Game 1, in which the variables $x^{(1)}_1, \ldots, x^{(1)}_l, \ldots x^{(2)}_1, \ldots, x^{(2)}_l, y_1, \ldots y_q$ are given to A as handles, collides with a formal polynomial in Game 0, in which the handles correspond to the variables that were fixed at the beginning of the game, is negligible. The same argument applies to Game 2 vs. Game 3. It is nontrivial to prove that A's view is the same in Game 1 as it is in Game 2. First, we must show that for computations carried out by the challenger in each of the three groups, $G^*_1$, $G^*_2$, and $G_T$, A's view is the same in both games. In $G^*_2$, for example, we prove that two group oracle queries to $G^*_2$ in Game 1 result in distinct formal polynomials if and only if the same two queries in Game 2 result in distinct polynomials. Then, the same must be shown, by induction, for signature queries too. If this sounds vague, it is because of the difficulty in conveying the details, which involve many variables and groups, in a high-level proof sketch Theorem 4 (Origin-hiding) The construction described above is origin-hiding in the generic group model for Type III bilinear groups.

Definition of Delegable Anonymous Credentials: Delegable anonymous credentials have been studied before and previous definitions exist. Anonymity means there is a simulator that, when interacting with the adversary on behalf of honest parties, creates for each interaction a transcript whose distribution is independent on the identity of the honest party interacting with the adversary. The extractability part means there is an extractor that "de-anonymizes" the parties under the adversary's control and guarantees that the adversary cannot prove possession of a credential that "de-anonymizes" to a credential chain not corresponding to a sequence of credential issue instances that have actually occurred. In an embodiment, we have a single security game, in which the adversary interacts with the system and attempts to break it either by forging a credential or de-anonymizing a user, or both. In an embodiment, we utilize cryptographic building blocks, such as mercurial signatures and (interactive) zero-knowledge proofs.

Definition 5 (Delegable anonymous credentials): A delegable anonymous credential scheme consists of algorithms (Setup, KeyGen, NymGen) and protocols for issuing/receiving a credential and proving/verifying possession of a credential as follows:

Setup(1k)→(params): A PPT algorithm that generates the public parameters params for the system.

KeyGen(params)→(pk,sk): A PPT algorithm that generates an "identity" of a system participant, which consists of a public and secret key pair (pk,sk). sk is referred to as the user's secret identity key, while pk is its public identity key. WLOG, sk is assumed to include both params and pk so that they need not be given to other algorithms as separate inputs. A root authority runs the same key generation algorithm as every other participant.

NymGen(sk, L(pk$_0^˘$))→(nym, aux): A PPT algorithm that, on input a user's secret identity key sk and level L(pk$_0^˘$) under the root authority whose public key is pk$_0^˘$, outputs a pseudonym nym for this user and the auxiliary information aux needed to use nym.

Issuing a credential: [Issue(L$_I$ (pk$_0^˘$), pk$_0^˘$, sk$_I$, nym$_I$, aux$_I$, cred$_I$, nym$_R$)↔Receive(L$_I$ (pk$_0^˘$), pk$_0^˘$, sk$_R$, nym$_R$, aux$_R$, nym$_I$)]→(cred$_R$): This is an interactive protocol between an issuer of a credential, who runs the Issue side of the protocol, and a receiver, who runs the Receive side. The issuer takes as input his own credential at level L$_I$ (pk$_0^˘$) under root authority pk$_0^˘$ together with all information associated with it. Specifically, this includes L$_I$ (pk$_0^˘$), the length of the issuer's credential chain; pk$_0^˘$, the public key of the root authority; sk$_I$, the issuer's secret key; nym$_I$, the pseudonym by which the issuer is known to the receiver and its associated auxiliary information, aux$_I$; and cred$_I$, the issuer's credential chain. The issuer also takes as input nym$_R$, the pseudonym by which the receiver is known to him. The receiver takes as input the same L$_I$ (pk$_0^˘$) and pk$_0^˘$, the same nym$_I$ and nym$_R$, her own secret key sk$_R$, and the auxiliary information aux$_R$ associated with her pseudonym nym$_R$. The receiver's output is her credential cred$_R$.

Note that there is a single protocol any issuer, including a root authority, runs with any recipient. A root authority does not use a pseudonym so our convention in that case is L$_I$ (pk$_0^˘$)=0, nym$_I$=pk$_0^˘$, and aux$_I$=cred$_I$=⊥. Also, note that credentials, like levels, are dependent on pk$_0^˘$(i.e. cred$_I$=cred$_I$ (pk$_0^˘$)), but this dependency has been omitted for clarity.

Proof of possession of a credential: [CredProve(LP (pk$_0^˘$), pk$_0^˘$, sk$_P$, nym$_P$, aux$_P$, cred$_P$)↔CredVerify(params, L$_P$ (pk$_0^˘$), pk$_0^˘$, nym$_P$)]→output (0 or 1): This is an interactive protocol between a prover, who is trying to prove possession of a credential and runs the CredProve side of the protocol, and a verifier, who runs the CredVerify side. The prover takes as input his own credential at level L$_P$ (pk$_0^˘$) under root authority pk$_0^˘$ together with all information associated with it. Specifically, this includes L$_P$ (pk$_0^˘$), the length of the prover's credential chain; pk$_0^˘$, the public key of the root authority; sk$_P$, the prover's secret key; nym$_P$, the pseudonym by which the prover is known to the verifier and its associated auxiliary information, aux$_P$; and cred$_P$, the prover's credential chain. The verifier takes as input params and the same L$_P$ (pk$_0^˘$), pk$_0^˘$, and nym$_P$. The verifier's output is 1 if it accepts the proof of possession of a credential and 0 otherwise. A delegate anonymous credential (DAC) system must be correct and secure.

Definition 6 (Correctness of DAC) A delegable anonymous credential scheme is correct if, whenever Setup, KeyGen and NymGen are run correctly and the Issue-Receive protocol is executed correctly on correctly generated inputs, the receiver outputs a certification chain that, when used as input to the prover in an honest execution of the CredProve-CredVerify protocol, is accepted by the verifier with probability 1. We now provide a description of the security game along with a definition of unforgeability and anonymity for delegable anonymous credentials under a single certification authority.

Security game. The security game is parameterized by (hard-to-compute) functions $f$, $f_{cred}$, and $fd_{demO}$. An adversary A interacts with a challenger C, who is responsible for setting up the keys and pseudonyms of all the honest participants in the system and for acting on their behalf when they issue, receive, prove possession of, or verify possession of credential chains. Throughout the game, C maintains the following state information:

1. A directed graph G(pk$_0^˘$)=(V (pk$_0^˘$), E(pk$_0^˘$)) that will consist of a single tree and some singleton nodes. The root of the tree is the node called root, and it has public key pk$_0^˘$.
2. Corresponding to every node v∈V (pk$_0^˘$), the following information:
   (a) v's level L(pk$_0^˘$, v) (i.e. v's distance to root pk$_0^˘$).
   (b) status(v), which specifies whether v corresponds to an honest or adversarial user.
   (c) If status(v)=honest, then
     pk(v), the public key associated with v;
     sk(v), the secret key corresponding to pk(v);
     all pseudonyms nym$_1$(v), . . . , nym$_n$(v) associated with v (if they exist) and their corresponding auxiliary information aux$_1$(v), . . . , aux$_n$(v);
     the user's credential cred$_v$:=cred$_v$(pk$_0^˘$) (if it exists);
     a value pk$_v^ˆ$, determined using the function $f$ (as we will see, pk$_v^ˆ$=$f$(pk(v))=$f$(nym$_i$ (v)) for nym$_i$ (v)∈{nym$_1$ (v), . . . , nym$_n$(v)}.)
   (d) If status(v)=adversarial, a value pk$_v^ˆ$, determined using the function $f$, that will be used as this node's identity. As we will see, pk$_v^ˆ$=$f$(nym(v)) if nym(v) is a pseudonym used by the adversary on behalf of node v. Note that for two different adversarial nodes v, v$_1$, it is possible that pk$_v^ˆ$=pk$_{v1}^ˆ$. This is not possible for honest nodes.
3. A forgery flag, which is set to true if the adversary forges a credential.
4. An anonymity bit b∈{0, 1}, a pair of anonymity challenge nodes (u$_0$, u$_1$), and the status of the anonymity attack. Define S to be the set of pairs of pseudonyms (nym(u$_b$), nym(u$^-_b$)) that the adversary has seen for the anonymity challenge node u$_b$ and the other node in the pair, u$^-_b$, where $^-$b=1−b. The challenger keeps track of S along with the auxiliary information for the pairs of pseudonyms it contains.

The security game is initialized as follows. The params are generated and given to the adversary A. Then, A(params) specifies whether the status of the root node is going to be honest or adversarial. If it is honest, the challenger C generates the root key pair, (pk$_0^˘$, sk$_0^˘$)←KeyGen(params); else, A supplies pk$_0^˘$ to C. Next, C sets the forgery flag to false and picks a random value for the anonymity bit b: b←{0, 1}. At this point, the anonymity attack has not begun yet, so its status is undefined. C stores G(pk$_0^˘$)=(V(pk$_0^˘$), E(pk$_0^˘$))=({root}, ∅) (i.e. the graph consisting of the root node and no edges) and sets status(root) to be as specified by A: pk(root)=pk$_0^˘$, and when status(root)=honest, sk(root)=sk$_0^˘$. Next, A can add nodes/users to G(pk$_0^˘$), both honest and adversarial, and have these users obtain, delegate, and prove possession of credentials by interacting with C using the following oracles:

AddHonestParty(u): A invokes this oracle to create a new, honest node u. C runs (pk(u), sk(u))←KeyGen (params), sets L(pk$_0^˘$, u)=∞, and returns pk(u) to A.

SeeNym(u): A invokes this oracle to see a fresh pseudonym for an honest node u. C runs (nym(u), aux(u))←NymGen(sk(u), L(pk$_0^˘$, u)) and returns nym(u) to A.

CertifyHonestParty(pk$_0^˘$, u, v): A invokes this oracle to have the honest party associated with u issue a credential to the honest party associated with v. A selects pseudonyms nym(u), nym(v) that he has seen for u, v (unless u=root), and C runs the protocols: [Issue(L (pk$_0^˘$, u), pk$_0^˘$, sk(u), nym(u), aux(u), cred$_u$, nym (v))↔Receive(L(pk$_O^\sim$, u), pk$_O^\sim$, sk(v), nym(v), aux(v), nym(u))]→cred$_v$. If u=root, then pk$_O^\sim$ is given as input instead of nym(u). C adds the edge (u, v) to the graph and sets L(pk$_O^\sim$, v)=L(pk$_O^\sim$, u)+1.

VerifyCredFrom(pk$_O^\sim$, u): The honest party associated with u proves to A that it has a credential at level L(pk$_O^\sim$, u). A selects a pseudonym nym(u) that he has seen for u, and C runs the CredProve protocol with A: CredProve(L(pk$_O^\sim$, u), pk$_O^\sim$, sk(u), nym(u), aux(u), cred$_u$)↔A.

GetCredFrom(pk$_O^\sim$, u, nym$_R$): The honest party associated with u issues a credential to A, whom it knows by nym$_R$. C creates a new adversarial node v and sets its identity to be pk$_v^\sim$=f(nym$_R$). A selects a pseudonym nym(u) that he has seen for u (unless u=root), and C runs the Issue protocol with A: Issue(L(pk$_O^\sim$, u), pk$_O^\sim$, sk(u), nym(u), aux(u), cred$_u$, nym$_R$)↔A. If u=root, then pk$_O^\sim$ is given as input instead of nym(u). C adds the edge (u, v) to the graph and sets L(pk$_O^\sim$, v)=L(pk$_O^\sim$, u)+1.

GiveCredTo(pk$_O^\sim$, L$_I$ (pk$_O^\sim$), nym$_I$, v): A issues a credential to the honest party associated with v under a pseudonym nym$_I$ (or pk$_O^\sim$ if he is the root). A selects a pseudonym nym(v) that he has seen for v, and C runs the Receive protocol with A: [A↔Receive(L$_I$ (pk$_O^\sim$), pk$_O^\sim$, sk(v), nym(v), aux(v), nym$_I$)]→cred$_v$. If A is the root, then pk$_O^\sim$ is given as input instead of nym$_I$. If cred$_v$≠⊥, C sets L(pk$_O^\sim$, v)=L$_I$ (pk$_O^\sim$)+1 and computes the function $f_{cred}$ on v's credential, $f_{cred}$(cred$_v$)=(pk$_O^\sim$, pk$_1^\sim$, . . . , pk$_{L1}^\sim$), revealing the identities in v's credential chain. If according to C's data structure, there is some pk$_i^\sim$ in this chain such that pk$_i^\sim$=f(nym(u)) for an honest user u, but pk$_{i+1}^\sim$≠f(nym(v$^I$)) for any v$^I$ that received a credential from u, then C sets the forgery flag to true. If cred$_v$≠⊥ and the forgery flag remains false, C fills in the gaps in the graph as follows. Starting from the nearest honest ancestor of v, C creates a new node for each (necessarily adversarial) identity in the chain between that honest node and v and sets its identity to be the appropriate pk$_i^\sim$. C then adds edges between the nodes on the chain from the nearest honest ancestor of v to v.

DemoCred(pk$_O^\sim$, L$_P$ (pk$_O^\sim$), nym$_P$): A proves possession of a credential at level L$_P$ (pk$_O^\sim$). C runs the Verify protocol with A: [A↔CredVerify(params, L$_P$ (pk$_O^\sim$), pk$_O^\sim$, nym$_P$)]→output (0 or 1). If output=1, C computes the function $f_{demo}$ on the transcript of the output, $f_{demo}$(transcript)=(pk$_O^\sim$, pk$_1^\sim$, . . . , pk$_{LP}^\sim$), and determines if a forgery has occurred as in GiveCredTo. If output=1 and the forgery flag remains false, C creates a new adversarial node v for the identity pk$_{LP}$ and sets L(pk$_O^\sim$, v)=L$_P$ (pk$_O^\sim$). C fills in the gaps in the graph as in GiveCredTo.

SetAnonChallenge(u$_0$, u$_1$): A will try to distinguish between the honest parties associated with u$_0$ and u$_1$.

SeeNymAnon: A invokes this oracle to see fresh pseudonyms for ub and u$^-_b$. C runs (nym(u$_b$), aux(u$_b$))←NymGen(sk(u$_b$), L(pk$_O^\sim$, u$_b$)), repeats this for u$^-_b$, and returns (nym(u$_b$), nym(u$^-_b$)) to A. CertifyHonestAnon(pk$_O^\sim$, u): A invokes this oracle to have the honest party associated with u issue credentials to u$_b$ and u$^-_b$. A selects pseudonyms (nym(u$_b$), nym(u$^-_b$)) and nym(u) that he has seen for u$_b$, u$^-_b$, and u, and C runs the protocols: [Issue(L(pk$_O^\sim$, u), pk$_O^\sim$, sk(u), nym(u), aux(u), cred$_u$, nym(u$_b$))↔Receive(L(pk$_O^\sim$, u), pk$_O^\sim$, sk(ub), nym(ub), aux(u$_b$), nym(u))]→cred$_{ub}$. If u=root, then pk$_O^\sim$ is given as input instead of nym(u). C adds the edge (u, u$_b$) to the graph and sets L(pk$_O^\sim$, u$_b$)=L(pk$_O^\sim$, u)+1. C repeats these steps for u$^-_b$, using the same nym(u) (if u≠root).

CertifyAnonHonest(pk$_O^\sim$, b*, v): A invokes this oracle to have one of the anonymity challenge nodes, ub*, where b*=b or $^-$b, issue a credential to the honest party associated with v. A selects pseudonyms (nym(u$_b$), nym(u$^-_b$)) and nym(v) that he has seen for ub, u$^-$b, and v, and C runs the protocols: [Issue(L(pk$_O^\sim$, ub*), pk$_O^\sim$, sk(ub*), nym(ub*), aux(ub*), cred$_{ub}$*, nym(v))↔Receive(L(pk$_O^\sim$, ub*), pk$_O^\sim$, sk(v), nym(v), aux(v), nym(ub*))]→cred$_v$. C adds the edge (ub*, v) to the graph and sets L(pk$_O^\sim$, v)=L(pk$_O^\sim$, ub*)+1.

VerifyCredFromAnon(pk$_O^\sim$): The honest parties associated with u$_b$ and u$^-_b$ prove to A that they have credentials at level L(pk$_O^\sim$, u$_b$)=L(pk$_O^\sim$, u$^-_b$). C checks that the two paths from u$_b$ and u$^-_b$ to the root pk$_O^\sim$ consist entirely of honest nodes, with the exception that pk$_O^\sim$ may be adversarial. If this check fails, C updates the status of the anonymity attack to forfeited. Next, A selects pseudonyms (nym(u$_b$), nym(u$^-_b$)) that he has seen for u$_b$ and u$^-_b$, and C runs the CredProve protocol with A: CredProve(L(pk$_O^\sim$, u$_b$), pk$_O^\sim$, sk(u$_b$), nym(u$_b$), aux(u$_b$), cred$_{ub}$)↔A. C repeats this step for u$^-_b$. GetCredFromAnon(pk$_O^\sim$, b*, nym$_R$): The honest party associated with ub*, where b*=b or $^-$b, issues a credential to A, whom it knows by nym$_R$. C checks the two paths from ub* and u$^-_{b*}$ to the root pk$_O^\sim$ as in VerifyCredFromAnon. Next, C creates a new adversarial node v and sets its identity to be pk$_v^\sim$=f(nym$_R$). Note that A can have ub*, u$^-_{b*}$ issue credentials to two different adversarial nodes v, v$^1$, respectively, with the same underlying adversarial identity pk$_v^\sim$=pk$_{v^I}^\sim$. A selects pseudonyms (nym(u$_{b*}$), nym(u$^-_{b*}$)) that he has seen for ub* and u$^-_{b*}$, and C runs the Issue protocol with A: Issue(L(pk$_O^\sim$, u$_{b*}$), pk$_O^\sim$, sk(u$_{b*}$), nym(u$_{b*}$), aux(u$_{b*}$), cred$_{ub*}$, nym$_R$)↔A. C adds the edge (u$_{b*}$, v) to the graph and sets L(pk$_O^\sim$, v)=L(pk$_O^\sim$, u$_{b*}$)+1.

GiveCredToAnon(pk$_O^\sim$, L$_I$ (pk$_O^\sim$), nymI): A issues credentials to u$_b$ and u$^-_b$ under a pseudonym nym$_I$ (or pk$_O^\sim$ if he is the root). A selects pseudonyms (nym(u$_b$), nym(u$^-_b$)) that he has seen for u$_b$ and u$^-_b$, and C runs the Receive protocol with A: [A↔Receive(LI (pk$_O^\sim$), pk$_O^\sim$, sk(u$_b$), nym(u$_b$), aux(u$_b$), nym$_I$)]→cred$_{ub}$. If A is the root, then pk$_O^\sim$ is given as input instead of nym$_I$. C repeats this step for u$^-_b$. If both cred$_{ub}$≠⊥ and credu$^-_b$≠⊥, C sets L(pk$_O^\sim$, u$_b$)=L$_I$ (pk$_O^\sim$)+1, computes the function $f_{cred}$ on u$_b$'s credential, $f_{cred}$(cred$_{ub}$)=(pk$_O^\sim$, pk$_O^\sim$, . . . , pk$_{1i}^\sim$), and determines if a forgery has occurred as in GiveCredTo. C repeats this step for u$^-_b$. If both cred$_{ub}$≠⊥ and credu$^-_b$≠⊥ and the forgery flag remains false, C fills in the gaps in the graph as follows. If there is already an adversarial node v corresponding to the pseudonym nym$_I$ with an edge connecting it to an honest parent, then C only adds an edge between v and u$_b$. Else, C creates a chain of edges and (adversarial) nodes from the nearest honest ancestor of u$_b$ to u$_b$ as in GiveCredTo. C repeats this step for u$^-_b$.

GuessAnon(b$^1$): If b$^1$=b, the status of the anonymity attack is set to success.

Definition 7 (Unforgeability and Anonymity) A delegable anonymous credential scheme is unforgeable and anonymous if there exist functions $f$, $f_{cred}$, and $f_{demo}$ such that for all PPT A, there exists a negligible function v such that:

1. the probability that the forgery flag will be true in the single-authority game is at most v(k), where k is the security parameter.

2. the probability that the status of the anonymity attack in the single-authority game will be success is at most $1/2+v(k)$.

In our anonymity game, two nodes, $u_0$ and $u_1$, may have credentials at the same level but still may not be appropriate candidates for the anonymity challenge; the two paths from $u_0$ and $u_1$ to the root must consist entirely of honest nodes, with the exception that the root may be adversarial. In an embodiment, the adversary is able to recognize himself on a credential chain, so if he were on $u_0$'s credential chain but not $u_1$'s, he would be able to distinguish the two. It would be relatively straightforward to "fix" our definition to not allow this: we would just need to remove the requirement that $u_0$ and $u_1$ have entirely honest paths to the root. Unfortunately, our construction only satisfies the weaker anonymity notion in which this requirement must be met. Other types of composition. Note that in our definition, the adversary invokes the oracles sequentially. Our definition gives no security guarantees when the oracles are invoked concurrently, and the adversary orchestrates the order in which protocol messages are exchanged. In an embodiment, there may be standard techniques for turning certain sequentially secure protocols into concurrently secure ones; there may also be well-known subtleties.

Suppose we have a mercurial signature scheme such that the space of public keys is a subset of the message space and $R_M = R_{pk}$. Furthermore, suppose it has the property that $sample_\mu = sample^\rho$ and on input ChangeRep(pk, M, $\sigma$, $\mu$), where $M = pk^1$, it outputs $(M^1, \sigma^1)$ such that $M^1 = ConvertPK(pk^1, \mu)$. To generate a key pair, each participant runs the KeyGen algorithm of the mercurial signature scheme to get (pk,sk). To generate a new pseudonym and its auxiliary information, pick $\rho$ and let nym=ConvertPK(pk, $\rho$), aux=$\rho$. A credential chain of length L will consist of a series of pseudonyms $(nym_1, \ldots, nym_L)$ and a series of signatures $(\sigma_1, \ldots, \sigma_L)$ such that (1) $\sigma_1$ is a signature on the message $nym_1$ under the certification authority's public key $pk_0\tilde{}$ (2) for $2 \leq i \leq L$, $\sigma_i$ is the signature on the message $nym_i$ under the public key $nym_{i-1}$. This is possible because the message space contains the space of public keys and the relations $R_M$ and $R_{pk}$ are the same. A credential chain can be randomized so as to be unrecognizable by using the ConvertSig and ChangeRep algorithms as follows. The input to this step is $(nym_1, \ldots, nym_L)$ and $(\sigma_1, \ldots, \sigma_L)$. In order to randomize it, pick random $(\rho_1, \ldots, \rho_L) \leftarrow sample^L_\rho$. Define $nym^1_0 = pk_0\tilde{}$, $\sigma 1\tilde{} = \sigma 1$. Now, perform two steps: (1) for $2 \leq i \leq L$, set $\sigma i\tilde{} = ConvertSig(nym_{i-1}, nym_i, \sigma_i, \rho_{i-1})$, and (2) for $1 \leq i \leq L$, set $(nym^1_i, \sigma^1_i) = ChangeRep(nym^1_{i-1}, nym_i, \sigma\tilde{}_i, \rho_i)$. This way, $nym^1_i$ is the new, unrecognizable pseudonym corresponding to the same underlying identity as $nym_i$, and $\sigma^1 i$ is a signature attesting to that fact, which verifies under the already updated pseudonym $nym^1_{i-1}$ (treated as a public key for the purposes of message verification). Finally, output $(nym^1_1, \ldots, nym^1_L)$ and $(\sigma^1_1, \ldots, \sigma^1_L)$.

In order to issue a credential, the issuer first has the receiver prove, via an interactive zero-knowledge proof of knowledge (ZKPoK), that the receiver knows the secret key associated with his pseudonym, $nym_R$. Then, the issuer randomizes his certification chain as described above and uses the last pseudonym on the randomized chain, $nym^1_L$, as his issuer's pseudonym, $nym_I$ (alternatively, he can give a zero-knowledge proof that the two are equivalent.) He then computes $\sigma_{L+1} = Sign(sk_I, nym_R)$, where $sk_I$ is the secret key that corresponds to $nym_I$. He sends the randomized chain as well as $\sigma_{L+1}$ to the receiver, who stores the resulting credential chain $(nym^1_1, \ldots, nym^1_L, nym_R)$ and $(\sigma^1_1, \ldots, \sigma^1_L, \sigma_{L+1})$. In order to prove possession of a credential, a prover first randomizes the credential chain, reveals it to the verifier, and proves knowledge of the secret key that corresponds to the last pseudonym, $nym^1_L$, on the certification chain. Unfortunately, we do not know of a construction of a mercurial signature in which the public key space is a subset of the message space. Our mercurial signature construction does not enjoy that property because messages are vectors in $G^*_1$, while public keys are vectors in $G^*_2$. However, we know how to construct a pair of mercurial signature schemes in which the public key space of one is the message space of the other, and vice versa. That is accomplished by just switching $G^*_1$ and $G^*_2$ in one of the schemes; the secret key space is the same in both. We can use this pair of mercurial signature schemes to construct delegable anonymous credentials similar to the intuitive way described above, except that we must invoke different algorithms for even positions on the certification chain than we do for odd positions. Let $MS_1 = (PPGen_1, KeyGen_1, Sign_1, Verify_1, ConvertSK_1, ConvertPK_1, ConvertSig_1, ChangeRep1)$ and $MS_2 = (PPGen_2, KeyGen_2, Sign_2, Verify_2, ConvertSK_2, ConvertPK_2, ConvertSig_2, ChangeRep_2)$ be two mercurial signature schemes that share the same parameter generation algorithm $PPGen_1 = PPGen_2$. Let $R_1, R_2, R_{sk}$ be parameterized relations such that $MS_1$ has message relation $R_1$, public key relation $R_2$, and secret key relation $R_{sk}$, while $MS_2$ has message relation $R_2$, public key relation $R_1$, and the same secret key relation $R_{sk}$. Suppose $sample_\mu = sample_\rho$ for both schemes and that the message space for the first scheme consists of public keys for the second one, and vice versa. Finally, suppose that both schemes satisfy class- and origin-hiding. Our construction consists of the following algorithms and protocols. Initially, a user runs KeyGen to obtain two key pairs, an odd pair and an even pair. Once a user receives a credential, her level is fixed, so she only uses the relevant key pair—the odd pair to be used at an odd level and the even pair at an even level.

Setup($1^k$)→(params): Compute PP←$PPGen_1(1^k)$=$PPGen_2(1^k)$ and output params=PP. KeyGen(params)→(pk,sk): There are two cases. For the root authority, compute $(pk_0\tilde{}, sk_0\tilde{}) \leftarrow KeyGen_1$ (PP, 1) and output it. For others, compute $(pk_{even}, sk_{even}) \leftarrow KeyGen_1$ (PP, 1) and $(pk_{odd}, sk_{odd}) \leftarrow KeyGen_2$ (PP, 1) and output both pairs of keys $(pk_{even}, sk_{even}), (pk_{odd}, sk_{odd})$. NymGen(sk, $L(pk_0\tilde{})$)→(nym, aux): If $L(pk_0\tilde{})=0$, output $(pk_0\tilde{}, \perp)$. Otherwise, pick random key converters $\rho_{even}$, $\rho_{odd}$ and compute $\tilde{}sk_{even} \leftarrow ConvertSK_1(sk_{even}, \rho_{even})$ and $nym_{even} \leftarrow ConvertPK_1(pk_{even}, \rho_{even})$. Similarly, compute $\tilde{}sk_{odd} \leftarrow ConvertSK_2(sk_{odd}, \rho_{odd})$ and $nym_{odd} \leftarrow ConvertPK_2(pk_{odd}, \rho_{odd})$. Output both pairs $(nym_{even}, \rho_{even}), (nym_{odd}, \rho_{odd})$.

In the following protocols, each algorithm is either from $MS_1$ or $MS_2$, but the even/odd subscripts have been omitted for clarity. For example, $\sigma_1 \leftarrow Sign(sk_0\tilde{}, nym_1)$ is computed as $\sigma_1 \leftarrow Sign_1(sk_0\tilde{}, nym_{1,odd})$ since the user $nym_1$ is fixed at odd level 1. Issuing a credential: Issue($L_1 (pk_0\tilde{}), pk_0\tilde{}, sk_I, nym_I, aux_I, cred_I, nym_R$)↔Receive($L_I (pk_0\tilde{}), pk_0\tilde{}, sk_R, nym_R, aux_R, nym_I)$]→$cred_R$: $\{(nym^1_1, \ldots, nym^1_{LI}, nym_R), (\sigma^1_1, \ldots, \sigma^1_{LI}, \sigma_{LI+1})\}$ The issuer first has the receiver prove, via an interactive ZKPoK, that the receiver knows the secret key, $sk_R$, associated with his pseudonym, $nym_R$.

Issue: Randomize credential chain.
1. If $L_I (pk_0\tilde{})=0$, $cred_I=\perp$. Define $nym^1_0=pk_0\tilde{}$, $\sigma^1_1\tilde{}=\sigma_1$.
  Compute $\sigma_1 \leftarrow Sign(sk_0\tilde{}, nym_1)$.
  Output $credR=(nym_1, \sigma_1)$ and send it to the receiver.
2. If $L_I(pk_0\tilde{}) \neq 0$, $cred_I=\{(nym_1, \ldots, nym_{LI}), (\sigma_1, \ldots, \sigma_{LI})\}$.
  Pick random $(\rho_1, \ldots, \rho_{LI}) \leftarrow sample^{LI}_\rho$.

If $L_I(pk_0^\sim)=1$, $nym^1_0=pk_0^\sim$, $\sigma_1^\sim=\sigma_1$ as above.

Compute $(nym^1_1, \sigma^1_1)$ ChangeRep$(nym^1_0, nym_1, \sigma^\sim_1, \rho_1)$.

If $L_1(pk_0^\sim)>1$, for $2 \le i \le LI$,

Compute $\sim\sigma_i \leftarrow$ ConvertSig$(nym_{i-1}, nym_i, \sigma_i, \rho_{i-1})$.

Then, compute $(nym^1_i, \sigma^1_i) \leftarrow$ ChangeRep$(nym^1_{i-1}, nym_i, \sigma^\sim_i, \rho_i)$.

Finally, output $(nym^1_1, \ldots, nym^1_{LI})$ and $(\sigma^1_1, \ldots, \sigma^1_{LI})$.

Compute $\sigma_{LI+1} \leftarrow$ Sign$(sk_{LI}, nym_R)$. Send the randomized chain as well as $\sigma_{LI+1}$ to the receiver.

Receive: Store the resulting credential chain $cred_R$: $\{(nym^1_1, \ldots, nym^1_{LI}, nym_R), (\sigma^1_1, \ldots, \sigma^1_{LI}, \sigma^1_{LI+1})\}$.

Proof of possession of a credential: [CredProve$(L_P(pk_0^\sim), pk_0^\sim, sk_P, nym_P, aux_P, cred_P)$ CredVerify$(params, L_P(pk_0^\sim), pk_0^\sim, nym_P)] \rightarrow$ output (0 or 1)

CredProve: Randomize the credential chain $credP=\{(nym_1, \ldots, nym_{LP}), (\sigma_1, \ldots, \sigma_{LP})\}$ as above and send the chain to the verifier. The prover then proves knowledge of the secret key that corresponds to the last pseudonym, $nym^1_{LP}$, on the randomized chain.

CredVerify: If $cred_P \neq \perp$, output 1; else, output 0.

In an embodiment, the above is correct, unforgeable, and anonymous in the single-authority security game, Unforgeability follows from unforgeability of mercurial signatures, while anonymity follows from class- and origin-hiding. In an embodiment, this scheme may be instantiated with our mercurial signature scheme describe above in Section 3. First of all, we need to establish an appropriate value for the length parameter l. It is easy to see that l=2 is good enough for our purposes, so that public keys and messages consist of two group elements each (l=1 is not good enough because then all messages and all public keys are equivalent.) A certification chain of length L will then have two group elements per pseudonym on the chain and three group elements per signature (according to our construction). Therefore, it takes 5L group elements to represent a credential chain of length L. Trust assumptions. Note that the only system-wide setup that needs to take place is the generation of the parameters for the system. When instantiated with mercurial signature from Section 3, this boils down to just the bilinear pairing setup. Even if the setup is carried out by a less-than-trustworthy party, it is unclear that this party can necessarily introduce trapdoors that would allow it to forge credentials or break anonymity. This is in contrast with previous constructions, in which the setup had to be carried out by a completely trustworthy process because trapdoors gleaned during this process would allow an adversary to completely break these systems (since these trapdoors allowed simulation and extraction, thus breaking both unforgeability and anonymity).

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
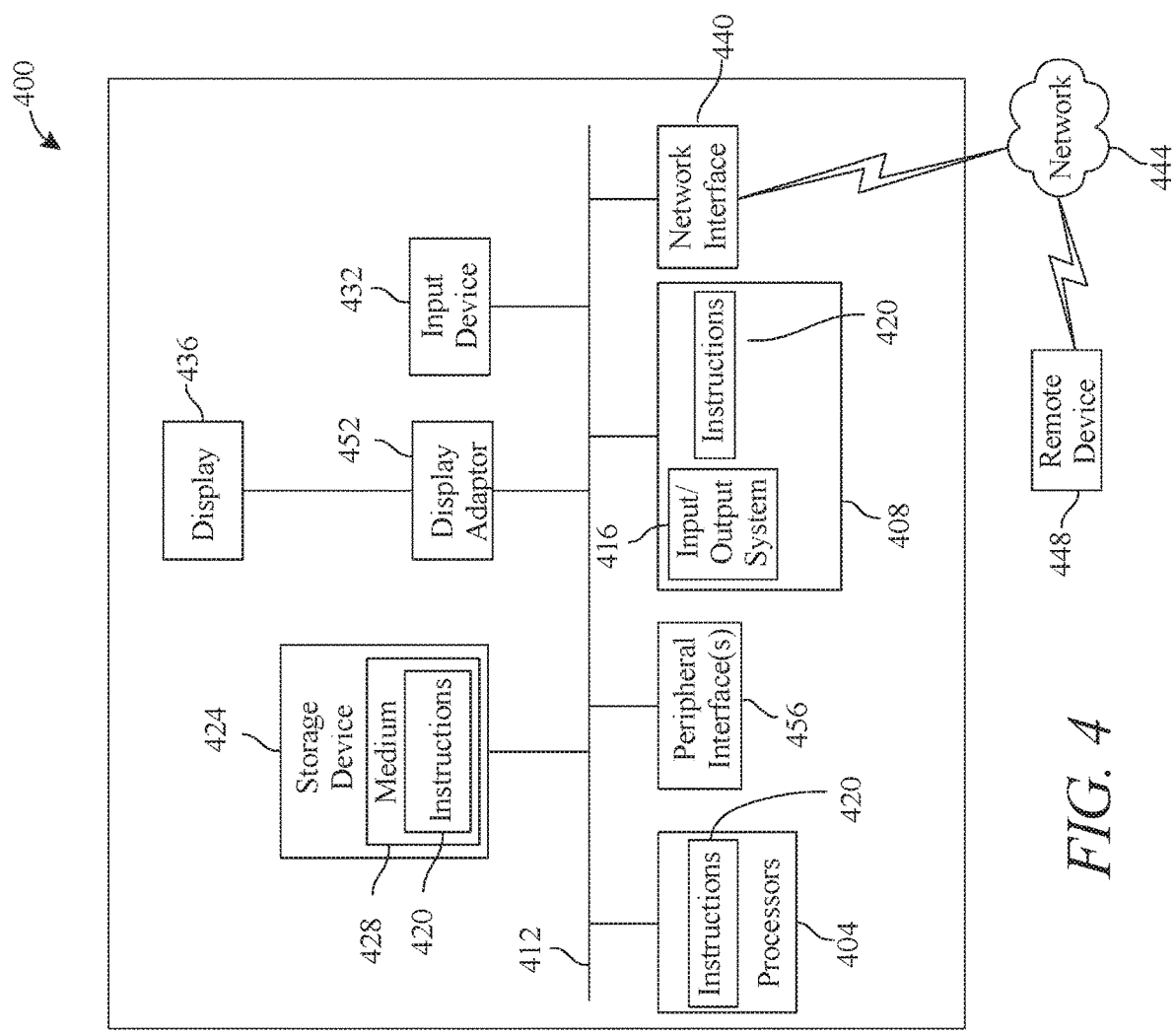
FIG. 4 is a block diagram of a computing system that can be used to implement any one or more of the methodologies disclosed herein any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIRE WIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of implementing an anonymized attestation chain, the method comprising:
   receiving, at a first device having a first hardware-generated secret and a first verification datum linked to the first hardware-generated secret, an originating signature from an originating device and an originating verification datum, wherein:
   the originating signature comprises a secure proof of an originating device secret;
   the originating signature signs a message referencing the first verification datum, the message conferring at least a credential to the first device; and
   the originating verification datum verifies the originating signature;
   generating, by the first device, an anonymized signature set, wherein the anonymized signature set comprises:
   a modified first verification datum linked to the first device secret;

a modified originating signature, wherein the modified originating signature comprises a secure proof of the originating device secret, and the modified originating signature signs a modified first message referencing the modified first verification datum; and a modified originating verification datum based on the originating verification datum, wherein the modified originating verification datum verifies the modified originating signature; and delegating, by the first device, the at least a credential to a second verification datum, wherein delegating further comprises:

generating a second message conferring the credential to the second verification datum; and digitally signing the second message using the first device hardware secret.

2. The method of claim 1, wherein the hardware-generated secret further comprises a secret generated using a physically unclonable function.

3. The method of claim 1, wherein the originating device further comprises a device operated by a manufacturer of the first device.

4. The method of claim 1, wherein the credential further includes a time-limited authorization token.

5. The method of claim 1, wherein receiving the originating signature further comprises retrieving the originating signature from a signature listing.

6. The method of claim 5, wherein retrieving the originating signature from the signature listing further comprises:

posting first verification datum to the signature listing;

determining that originating device has signed the first verification datum at the signature listing; and retrieving the originating signature from the signature listing.

7. The method of claim 1, wherein a second device possessing the modified first verification datum is unable to derive the first verification datum from the modified first verification datum.

8. The method of claim 1, wherein a second device possessing the modified originating signature is unable to derive the originating signature from the modified originating signature.

9. The method of claim 1, wherein a second device possessing the modified first message is unable to derive the first message from the modified first message.

10. The method of claim 1, wherein a second device possessing the modified originating verification datum is unable to derive the originating verification datum from the modified originating verification datum.

11. A system for implementing an anonymized attestation chain, the system comprising a first device having a first hardware-generated secret and a first verification datum linked to the first hardware-generated secret configured to:

receive an originating signature from an originating device and an originating verification datum, wherein:

the originating signature comprises a secure proof of an originating device secret;

the originating signature signs a message referencing the first verification datum, the message conferring at least a credential to the first device; and the originating verification datum verifies the originating signature;

generate an anonymized signature set, wherein the anonymized signature set comprises:

a modified first verification datum linked to the first device secret;

a modified originating signature, wherein the modified originating signature comprises a secure proof of the originating device secret, and the modified originating signature signs a modified first message referencing the modified first verification datum; and a modified originating verification datum based on the originating verification datum, wherein the modified originating verification datum verifies the modified originating signature; and delegate the at least a credential to a second verification datum, wherein delegating further comprises:

generating a second message conferring the credential to the second verification datum; and digitally signing the second message using the first device hardware secret.

12. The system of claim 11, wherein the hardware-generated secret further comprises a secret generated using a physically unclonable function.

13. The system of claim 11, wherein the originating device further comprises a device operated by a manufacturer of the first device.

14. The system of claim 11, wherein the credential further includes a time-limited authorization token.

15. The system of claim 11, wherein the first device 104 is further configured to receive the originating signature by retrieving the originating signature from a signature listing.

16. The system of claim 15, wherein retrieving the originating signature from the signature listing further comprises:

posting first verification datum to the signature listing;

determining that originating device has signed the first verification datum at the signature listing; and retrieving the originating signature from the signature listing.

17. The system of claim 11, wherein a second device possessing the modified first verification datum is unable to derive the first verification datum from the modified first verification datum.

18. The system of claim 11, wherein a second device possessing the modified originating signature is unable to derive the originating signature from the modified originating signature.

19. The system of claim 11, wherein a second device possessing the modified first message is unable to derive the first message from the modified first message.

20. The system of claim 11, wherein a second device possessing the modified originating verification datum is unable to derive the originating verification datum from the modified originating verification datum.

* * * * *